(12) United States Patent
van Dijk et al.

(10) Patent No.: US 11,714,772 B2
(45) Date of Patent: Aug. 1, 2023

(54) ADDITIONAL COMMUNICATION IN STANDARDIZED PINOUT OF A BIDIRECTIONAL INTERFACE BETWEEN A FIRST AND SECOND COMMUNICATION DEVICE

(71) Applicant: NXP B.V., Eindhoven (NL)

(72) Inventors: Lucas Pieter Lodewijk van Dijk, Kranenburg (DE); Bernd Uwe Gerhard Elend, Hamburg (DE); Janett Habermann, Norderstedt (DE); Georg Olma, Grasbrunn (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/660,393

(22) Filed: Apr. 22, 2022

(65) Prior Publication Data

US 2022/0342839 A1 Oct. 27, 2022

(30) Foreign Application Priority Data

Apr. 23, 2021 (EP) .................................. 21170155

(51) Int. Cl.
*G06F 13/40* (2006.01)
*G06F 13/38* (2006.01)
*G06F 13/42* (2006.01)

(52) U.S. Cl.
CPC ........ *G06F 13/4027* (2013.01); *G06F 13/385* (2013.01); *G06F 13/4204* (2013.01)

(58) Field of Classification Search
CPC . G06F 13/4027; G06F 13/385; G06F 13/4204
See application file for complete search history.

(56) References Cited

U.S. PATENT DOCUMENTS

| | | | | |
|---|---|---|---|---|
| 5,602,494 | A | * | 2/1997 | Sundstrom ..... H03K 19/018592 326/86 |
| 9,250,299 | B1 | | 2/2016 | Yarlagadda et al. |
| 10,838,906 | B1 | | 11/2020 | van Dijk |

(Continued)

FOREIGN PATENT DOCUMENTS

EP 2339778 A1 6/2011

*Primary Examiner* — Ilwoo Park
*Assistant Examiner* — Aurangzeb Hassan
(74) *Attorney, Agent, or Firm* — Jonathan J. Sapan

(57) ABSTRACT

A communication device is configured to exchange regular data bidirectionally with counterpart communication device via a regular interface; and to exchange additional data bidirectionally with the counterpart device via an additional interface. The device has a regular pinout corresponding to the regular interface that enables communication of regular data with the counterpart device; and an additional pinout with at least one additional pin, corresponding to the additional interface that enables communication of additional data with the counterpart device. The device has default data handling circuitry communicatively coupled to the additional pin, and configured, in a default mode, to transmit and receive additional default data via the additional pin. The first device has additional function data handling circuitry communicatively coupled to the additional pin and configured, in an active mode, to transmit and receive additional function data via the additional interface.

26 Claims, 13 Drawing Sheets

(56) References Cited

U.S. PATENT DOCUMENTS

| | | | |
|---|---|---|---|
| 2005/0180442 A1* | 8/2005 | Birsan | H04L 12/4135 370/410 |
| 2008/0191741 A1* | 8/2008 | Bancel | G01R 31/31719 326/46 |
| 2015/0120975 A1 | 4/2015 | Sengoku | |
| 2020/0084064 A1 | 3/2020 | Hartwich et al. | |
| 2020/0403823 A1* | 12/2020 | van Dijk | H04L 67/12 |

* cited by examiner

ADDITIONAL COMMUNICATION IN STANDARDIZED PINOUT OF A BIDIRECTIONAL INTERFACE BETWEEN A FIRST AND SECOND COMMUNICATION DEVICE

TECHNICAL AREA

The present disclosure relates to bi-directional communication between a first and a second communication device, for example between a transceiver and a microcontroller, and in particular to additional communication functionality provided in addition to a regular bidirectional communication between the first and the second communication device. Specifically, the present disclosure relates to a first communication device, for example a transceiver, for sending and receiving data over a bidirectional interface, a second communication counterpart device, for example a microcontroller, for sending and receiving data over a bidirectional interface, a system comprising a first communication device and a second communication counterpart device, and a method for sending and receiving data, in particular additional data, between a first communication device and a second communication counterpart device. The first communication device may be implemented for example as a transceiver, in particular as a transceiver in a bus system, more in particular as a transceiver in a bus system used in automotive systems. The second communication counterpart device may be implemented for example as a counterpart microcontroller, in particular as a microcontroller in a bus system, more in particular as a microcontroller in a bus system used in automotive systems.

TECHNICAL BACKGROUND

In automotive systems, the CAN (Controller Area Network), LIN (Local Interconnect Network) and FlexRay protocols are widespread in-vehicle-networking standards. Implementations of these standards make use of i) a CAN, LIN or FlexRay transceiver, and ii) an according CAN, LIN or FlexRay controller, respectively. The transceiver is thereby acting as a buffer and as a level shifter between the microcontroller and the wiring harness, which connects to other modules in the e.g. automotive system. It is foreseen that future transceivers need to exchange/transmit additional data, for example functional safety data, with/to the microcontroller, and might also need to receive additional data, for example configuration data, from the microcontroller. One driver for the need to exchange additional data between the microcontroller and the transceiver might be functional safety.

However, the package and the pinout of transceivers of present day's applications, such as for example in automotive systems, is (de facto) standardized. Accordingly, additional pins cannot be used for this purpose of enabling additional communication between the transceiver and the microcontroller. The present disclosure addresses this issue and proposes system devices and methods that allow for additional communication between the system devices, for example a microcontroller and a transceiver, without modifying the pinout of the system devices, for example the microcontroller and the transceiver. Moreover, the proposed method that allows for additional communication between the system devices remains fully compliant with the existing CAN, LIN and FlexRay standards, respectively.

The CAN standard is documented in ISO11898-x, as well as in CAN-FD and in CAN-XL, and in SIC CAN (CIA 601-4). The LIN standard is documented in ISO9141-2. The FlexRay standard is documented in ISO17458-x.

U.S. Pat. No. 10,838,906 B2 discloses systems and methods for communication between a transceiver and a microcontroller, based on the CAN standard. A transceiver is configured to send and receive data over a data bus, and includes a communication port including a CANH and a CANL pin to connect to the data bus. The transceiver further includes a bus idle detector configured to detect when the data bus is idle, and further a TXDC interface configured to selectively receive and send data and an RXDC interface configured to send data, from and to a microcontroller, respectively. The transceiver also includes a switch controlled by an output of the bus idle detector. The switch is configured to cause the TXDC interface to be used for sending data out, when the bus idle detector detects that the data bus is idle. In this prior art, an additional communication is always initiated by a bus idle and hence depends on the bus load. Accordingly, the additional communication in this prior art cannot be freely initiated and determined by an application residing e.g. in the microcontroller.

US 2020/0084064 A1 discloses a method for communicating between a microcontroller and a transceiver. The microcontroller includes a first pin for transmitting output data to the transceiver component. The microcontroller includes a second pin for receiving input data from the transceiver component, which includes a first input for receiving the output data. The transceiver component includes a first output for transmitting the input data. The transceiver component includes an interface for a data bus. The transceiver component transmits output data via the interface and receiving input data via the interface. The transceiver component includes an additional function device with a second input and a second output. Additional data are at least intermittently transferred from the first pin to the second input via the first input, and/or from the second output via the first output to the second pin. This prior art explicitly sticks to using an available TXD RXD interface for transmission of additional data. It relies on specific approaches for such communication, namely using a time domain multiplexing, using a frequency domain multiplexing, and using a multi level encoding, all of which require hardware overhead and/or hardware changes in both the transceiver and the microcontroller.

SUMMARY OF THE PRESENT DISCLOSURE

It is a general object of the present disclosure to provide a transceiver and a method allowing for an additional communication interface, and thereby additional communication, between a microcontroller and the transceiver without modifying the pinout of the transceiver and the pinout of the microcontroller, and without need to implement a protocol controller in the transceiver.

These objects can be generalized to applications, which are independent from a coupling of the transceiver to a bus system and from a counterpart microcontroller that uses the microcontroller to communicate with other nodes connected to the bus. In generalized applications, the focus is primarily directed to communication and additional communication between a pair of devices, rather than other communication with a bus system. In such generalized applications, the pair or system formed by a transceiver and a counterpart microcontroller may be replaced by a communicating pair or system formed (i) by a memory device and a counterpart microcontroller, (ii) by a memory device and a counterpart digital signal processor (DSP), or (iii) by a memory device and a counterpart processing device. In this disclosure, the pair or system of mutually communicating devices shall be denoted as a "first communication device" and a "second communication counterpart device".

Accordingly, it is a generalized object of the present disclosure to provide a first communication device and a method allowing for an additional communication interface, and thereby additional communication, between a second communication counterpart device and the first communication device without modifying the pinout of the first communication device and the pinout of the second communication counterpart device, and without need to implement a protocol controller in the first communication device.

According to a first aspect of the present disclosure, there is provided a first communication device for transmitting and receiving regular data via a first predetermined regular bidirectional interface, respectively, to and from a second communication counterpart device, and for transmitting and receiving additional data via a first predetermined additional bidirectional interface, respectively, to and from the second communication counterpart device. The first communication device has a predetermined pinout comprising a predetermined regular pinout, which corresponds to the predetermined regular bidirectional interface configured to support regular bidirectional communication of regular data with the second communication counterpart device, and a predetermined additional pinout, which corresponds to the predetermined additional bidirectional interface configured to support additional bidirectional communication of additional data with the second communication counterpart device. Herein the additional pinout comprises at least a first additional pin, wherein the corresponding additional bidirectional interface comprises a first input/output, I/O, cell, which has a first input that is communicatively coupled to the first additional pin and a first output, and which is configurable to operate either as a first additional output driver or as a first additional input cell. Moreover, the first communication device has a first additional default data handling circuitry, which is communicatively coupled to the first output of the first I/O cell, and which is configured to transmit and receive additional default data via the additional bidirectional interface, when a default mode is active. Still further, the first communication device has a first additional function data handling circuitry, which is communicatively coupled to the first output of the first I/O cell, and which is configured to transmit and receive additional function data via the additional bidirectional interface, when an additional function mode is active.

The first additional default data handling circuitry is provided and configured to receive, process, generate, and output or transmit additional default data, according to a default mode of operating the predetermined additional bidirectional interface and using the additional pinout, i.e. when the default mode is active. The expression "additional" refers to the fact that the default data are handled, and communicated via the predetermined additional bidirectional interface in addition to the regular data, which are handled and communication via the predetermined regular bidirectional interface.

By further providing the first additional function data handling circuitry, which can be communicatively coupled to the first IO cell as an alternative to the first additional default data handling circuitry in an additional function mode of operating the predetermined additional bidirectional interface and using the additional pinout, i.e. when an additional function mode is active, additional function data can be received, processed, generated, and outputted or transmitted by the additional function data handling circuitry. Accordingly, the additional function data can be handled without modifying the pinout of the first communication device, and without need to implement a protocol controller in the first communication device.

The provision of only one additional pin and the associated one IO cell allows for only a serial transmission of additional data over the additional bidirectional interface, and namely only a serial transmission of additional data in a first direction, e.g. from the second to the first communication device, followed by a serial transmission of additional data in a second direction that is opposite to the first direction, e.g. from the first to the second communication device.

In an embodiment of the first communication device according to the first aspect, the first communication device may be selected from a group including a corresponding processing device, a corresponding digital signal processor, and a corresponding microcontroller, and the second communication counterpart device may be a memory device, or vice versa.

In an embodiment of the first communication device according to the first aspect, the predetermined regular pinout of the first communication device may comprise at least one transmitting pin and at least one receiving pin, wherein the regular bidirectional interface may comprise at least one output driver communicatively coupled to the at least one transmitting pin and at least one input cell communicatively coupled to the at least one receiving pin. In this embodiment, the first communication device may further comprise a regular communication control circuitry, which may be communicatively coupled to the at least one output driver and to the at least one input cell, and which may be configured to transmit regular data via the at least one output driver to, and receive regular data via the at least one input cell from, the second communication counterpart device.

In an embodiment of the first communication device according to the first aspect, the first communication device may further have an additional pin monitoring device, which may be communicatively coupled to the first additional pin, and which may be configured to monitor data traffic via the first additional pin and to detect an additional function communication start signal present in the data traffic of additional default data received via the first additional pin, and which may be further configured to deactivate the default mode and to activate the additional function mode, when an additional function communication start signal is detected in the data traffic of additional default data received via the first additional pin.

The additional pin monitoring device enables the use of an additional function communication start signal as a means for indicating the initiation or start or switching over to the additional communication of additional function data. The additional function communication start signal may be generated in, and transmitted by, the second communication counterpart device at any time, and independently from the predetermined regular bidirectional communication which is handled by the predetermined regular bidirectional interface.

In an embodiment of the first communication device according to the first aspect, the additional pin monitoring device may be configured to generate a mode indication signal, which is configured to indicate that the additional function mode is active, when an additional function communication start signal is detected in the data traffic of additional default data received via the first additional function pin, and which is configured to indicate that the default mode is active, when the additional function mode is deactivated. In this embodiment, the first communication device may further have a first switch device, which may comprise an input, which is communicatively coupled to the first output of the first I/O cell, a first output, which is communicatively coupled to the first additional default data handling circuitry, and a second output, which is communicatively coupled to the first additional function data handling circuitry. In this embodiment, the first switch device may be configured to be controllable by the mode indication signal, wherein the first switch device communicatively couples its input to its first output, when the mode indication signal indicates that the default mode is active, and communicatively couples its input to its second output, when the mode indication signal indicates that the additional function mode is active.

The provision of the first switch device enables the switching over of the communicative coupling of the first additional default data handling circuitry via the IO cell to the first additional pin to the communicative coupling of the first additional function data handling circuitry via the IO cell to the first additional pin, and hence the switching over between different destinations and different uses of the different types of data that can communicated/transmitted via the predetermined additional bidirectional interface, viz. additional default data and additional function date.

In an embodiment of the first communication device according to the first aspect, the first communication device may further have a start signal generation circuitry, which has a first output, and which is capable to generate an additional function communication start signal and to output a generated additional function communication start signal via its first output. In this embodiment, the first output of the start signal generation circuitry is communicatively coupled to the second output of the switch device, so that the first communication device is capable to transmit an additional function communication start signal through the first I/O cell and via the first additional pin, when the first switch device is controlled to couple its input to its second output.

By providing the start signal generation circuitry in the first communication device, it is possible to initiate an additional communication also by the first communication device.

In an embodiment of the first communication device according to the first aspect, the additional pinout may have at least one further additional pin, in particular a plurality of further additional pins. In this embodiment, the corresponding additional bidirectional interface may further comprise at least one further I/O cell, in particular a plurality of further I/O cells, each of which has a further input and a further output and is configurable to operate either as a further additional output driver or as a further additional input cell. Herein, each one of the further inputs of the further I/O cells is communicatively coupled to a corresponding one of the further additional pins. In this embodiment, the first communication device may have at least one further additional default data handling circuitry, in particular a plurality of further additional default data handling circuitries, each of which is communicatively coupled to a corresponding one of the further outputs of the further I/O cells and configured to transmit and receive additional default data via the additional bidirectional interface, when the default mode is active. Further in this embodiment, the first communication device may further have at least one further additional function data handling circuitry, in particular a plurality of further additional function data handling circuitries, each of which is communicatively coupled to a corresponding one of the further outputs of the further I/O cells and configured to transmit and receive additional function data via the additional bidirectional interface, when the additional function mode is active.

By providing further additional pins, associated further IO cells, and associated further additional default data handling circuitry and further additional function data handling circuitry, the limitation of the additional bidirectional interface to only serial transmission of additional data is set aside. Rather, by using plural additional pins and plural associated downstream circuitry (TO cells, additional default data handling circuitry, and additional function data handling circuitry), additional data can be transmitted over the additional bidirectional interface in a parallel transmission mode, thus increasing an overall data transmission rate over the additional interface. In other words, the use of plural additional pins and plural associated downstream circuitry for parallel transmission of data solves a limitation of the use of only one additional pin and associated downstream circuitry, namely the limited bandwidth.

In an embodiment of the first communication device according to the first aspect, the first communication device may further have at least one further switch device, in particular a plurality of further switch devices, each of which comprises an input, which is communicatively coupled to the further output of a corresponding further I/O cell, a first output, which is communicatively coupled to the corresponding further additional default data handling circuitry, and a second output, which is communicatively coupled to the corresponding further additional function data handling circuitry. In this embodiment, each one of the further switch devices is configured to be controllable by the mode indication signal, wherein each one of the further switch devices communicatively couples its input to its first output, when the mode indication signal indicates that the default mode is active, and communicatively couples its input to its second output, when the mode indication signal indicates that the additional function mode is active.

The provision of plural further switching devices, one associated to each further additional pin or transmission channel, allows to switch independently in each transmission channel the destination of the transmitted additional data.

In an embodiment of the first communication device according to the first aspect, the additional pin monitoring device may be communicatively coupled to each one of the further additional pins, may be configured to monitor data traffic via each one of the further additional pins, to detect an additional function communication start signal or at least a portion of an additional function communication start signal present in the data traffic of additional default data received via a respective one of the further additional pins. The additional pin monitoring device may be configured to deactivate the default mode and to activate the additional function mode, when an additional function communication start signal or at least a portion of an additional function communication start signal is detected in the data traffic of additional default data received via any one of the further additional pins, or when at least a first portion of an additional function communication start signal is detected in the data traffic of additional default data received via a first one of the further additional pins and at least a second portion of an additional function communication start signal is detected in the data traffic of additional default data received via a second one of the further additional pins.

The communicatively coupling of the additional pin monitoring device to each one of the further additional pins enables to "distribute" the additional function communication start signal over plural parallel transmission channels. In other words, the additional function communication start signal can be implemented on multiple additional pins as well. This allows to make the pulse detection less sensitive to interference or false detection based on interference. When using only one of the additional pins for transmitting the start pulse, the start pulse would have to be extended to a pulse sequence in order to reduce interference, however that would make the start pulse longer. The start pulse can be based on a pattern instead of only a single pulse. Using the multiple further additional pins for parallel transmission of (portions of) the start pulse allows a more robust start signal detection mechanism. The pulse pattern may be implemented in parallel rather than only serial as would be the case when using only one additional pin to transmit the start pulse. This allows a more reliable pulse detection without sacrificing on the overall pulse length.

In an embodiment of the first communication device according to the first aspect, the first communication device may be configured to initiate an additional bidirectional communication involving additional function data for the additional function data handling circuitry with the second communication counterpart device.

In this embodiment, the first communication device may have one of the following feature combinations (A or B):

A. after initiation of the additional bidirectional communication by the first communication device, the I/O cell may be configurable as an output driver, and the additional function data handling circuitry may be configurable to transmit first additional function data via the I/O cell to the second communication counterpart device, and in particular, further, after transmitting the first additional function data from the additional function data handling circuitry to the second communication counterpart device, the I/O cell may be reconfigurable as an input cell, and the additional function data handling circuitry may be reconfigurable to receive second additional function data via the I/O cell from the second communication counterpart device; or B. after initiation of the additional bidirectional communication by the first communication device, the I/O cell may be configurable as an input cell, and the additional function data handling circuitry may be configurable to receive first additional function data via the I/O cell from the second communication counterpart device, and in particular, further, after receiving the first additional function data by the additional function data handling circuitry from the second communication counterpart device, the I/O cell may be reconfigurable as an output driver, and the additional function data handling circuitry may be reconfigurable to transmit second additional function data via the I/O cell to the second communication counterpart device.

In an embodiment of the first communication device according to the first aspect, the second communication counterpart device may be configured to initiate an additional bidirectional communication involving additional function data, and the first communication device may be configured to handle the additional bidirectional communication for the additional function data handling circuitry with the second communication counterpart device.

In this embodiment, the first communication device may have one of the following feature combinations (C or D):

C. after initiation of the additional bidirectional communication by the second communication counterpart device, the I/O cell may be configurable as an input cell, and the additional function data handling circuitry may be configurable to receive first additional function data via the I/O cell from the first communication counterpart device, and in particular, further, after receiving the first additional function data from the first communication counterpart device by the additional function data handling circuitry, the I/O cell may be reconfigurable as an output driver, and the additional function data handling circuitry may be configurable to transmit second additional function data via the I/O cell to the first communication counterpart device; or D. after initiation of the additional bidirectional communication by the second communication counterpart device, the I/O cell may be configurable as an input cell, and the additional function data handling circuitry may be configurable to transmit first additional function data via the I/O cell to the first communication counterpart device, and in particular, further, after transmitting the first additional function data to the first communication counterpart device by the additional function data handling circuitry, the I/O cell may be reconfigurable as an input cell, and the additional function data handling circuitry may be configurable to receive second additional function data via the I/O cell from the first communication counterpart device.

In embodiments of the first communication device according to the first aspect, the first communication device may have one of the following features:

i. The first communication device may be a memory device, and the second communication counterpart device may be selected from a group including a corresponding processing device, a corresponding digital signal processor, and a corresponding microcontroller;

ii. The first communication device may be selected from a group including a corresponding processing device, a corresponding digital signal processor, and a corresponding microcontroller, and the second communication counterpart device may be a corresponding memory device;

iii. The first communication device may be a microcontroller, and the second communication counterpart device may be a corresponding transceiver;

iv. The first communication device may be a microcontroller comprising a Controller Area Network, CAN, controller, and the second communication counterpart device may be a corresponding CAN transceiver;

v. The first communication device may be a microcontroller comprising a Local Interconnect Network, LIN, controller, and the second communication counterpart device may be a corresponding LIN transceiver;

vi. The first communication device may be a microcontroller comprising a FlexRay controller, and the second communication counterpart device may be a corresponding FlexRay transceiver;

vii. The first communication device may be a transceiver, and the second communication counterpart device may be a corresponding microcontroller;

viii. The first communication device may be a CAN transceiver, and the second communication counterpart device may be a corresponding microcontroller comprising a CAN controller;

ix. The first communication device may be a LIN transceiver, and the second communication counterpart device may be a corresponding microcontroller comprising a LIN controller;

x. The first communication device may be a FlexRay transceiver, and the second communication counterpart device may be a corresponding microcontroller comprising a FlexRay controller;

xi. the predetermined regular pinout of the first communication device comprises at least one transmitting pin and at least one receiving pin, wherein the regular bidirectional interface comprises at least one output driver communicatively coupled to the at least one transmitting pin and at least one input cell communicatively coupled to the at least one receiving pin, and wherein the first communication device further comprises a regular communication control circuitry, which is communicatively coupled to the at least one output driver and to the at least one input cell, and which is configured to transmit regular data via the at least one output driver to, and receive regular data via the at least one input cell from, the second communication counterpart device.

In other embodiments of the first communication device according to the first aspect, the first communication device may have one of the following features:

xii. After the additional function communication start signal has been detected and while the I/O cell is being used for transmitting additional function data, the first additional pin cannot be used in its default mode function for receiving and sending default data.

xiii. After the additional function communication start signal has been detected and while the I/O cell is being used for transmitting additional function data, in a first communication device according to any one of the features iv) to vi) and vii) to x) of the above-described embodiments, the regular bidirectional interface can, without interruption, be used in a respective standard mode function for sending and receiving bus data according to the respective bus standard, in particular which may be at least one of the CAN bus standard, the LIN bus standard, and the FlexRay standard;

xiv. The additional function communication start signal may be a pulse having at least one of the following features: a predefined polarity, for example a raising leading edge and a falling trailing edge, or a falling leading edge and a raising trailing edge, and a predefined pulse width, for example approximately 100 μs;

xv. After having sent first additional function data via the I/O cell and the first additional pin and when second additional function data are not to be sent in response to having sent the first additional function data, the first additional pin may be reconfigurable to be used in its default mode function for transmitting default data;

xvi. After having sent first additional function data via the I/O cell and the first additional pin in a first direction and after having sent second additional function data via the I/O cell and the first additional pin in a second direction opposite to the first direction, the first additional pin may be reconfigurable to be used in its default mode function for transmitting default data.

In embodiments of any one of the options vii) to x) of embodiments of the first communication device described above, the second communication counterpart device may be a microcontroller, and the first communication device may be a transceiver configured for sending and receiving data over a data bus, and for sending bus data to and receiving bus data from the corresponding microcontroller. The predetermined regular pinout of the transceiver may have a bus pin, a first input pin and a first output pin. In this embodiment, the transceiver may have: a bus interface communicatively coupled to the bus pin, and configured to send bus data via the bus pin to, and to receive bus data via the bus pin from, the data bus; a first input cell communicatively coupled to the first input pin, and configured to receive bus transmit data from the microcontroller; and a first output driver communicatively coupled to the first output pin, and configured to transmit bus receive data to the microcontroller.

In the embodiments hereinabove, advantageously, the data bus may be selected from one of the group that comprises a Controller Area Network, CAN, bus, a Local Interconnect Network, LIN, bus, and a FlexRay bus. In these embodiments, the transceiver may have one of the following features:

(a) when the data bus is a CAN bus, the first input port is a TXDC pin, the first output port is a RXDC pin, and the first additional pin is an S input pin, and the bus port comprises a CANH pin and a CANL pin;

(b) when the data bus is a LIN bus, the first input port is a TXDL pin, the first output port is a RXDL pin, and the first additional pin is an SLP_N input pin, and the bus port comprises LIN pin;

(c) when the data bus is a FlexRay bus, the first input port is a TXD pin, the first output port is a RXD pin, and the first additional pin is an EN input pin, and the bus port comprises a BP pin and a BM pin.

According to a second aspect of the present disclosure, there is provided a second communication counterpart device for transmitting and receiving regular data via a first bidirectional interface, respectively, to and from a corresponding first communication device according to the first aspect of the present disclosure, and for transmitting and receiving additional data via a first additional interface, respectively, to and from the corresponding first communication counterpart device according to the first aspect of the present disclosure.

In embodiments of the second communication counterpart device according to the second aspect, the second communication counterpart device may have the same features and functionality as the corresponding first communication device as described above and in all of the embodiments thereof described above.

According to a third aspect of the present disclosure, there is provided a system comprising a first communication device according to the first aspect of the present disclosure and a second communication counterpart device according to the second aspect of the present disclosure.

In embodiments of the system according to the third aspect, each pin of the regular pinout of the first communication device is communicatively coupled to a corresponding pin of the regular pinout of the second communication counterpart device, and each pin of the additional pinout of the first communication device is communicatively coupled to a corresponding pin of the additional pinout of the second communication counterpart device.

According to a fourth aspect of the present disclosure, there is provided a method for transmitting and receiving data between a first communication device and a second communication counterpart device, wherein the first communication device is a first communication device according to the first aspect in all embodiments thereof described above, and the second communication counterpart device is a second communication counterpart device according to the second aspect in all embodiments thereof described above.

The method includes in the default mode, communicatively coupling the first additional default data handling circuitry to the I/O cell, and transmitting additional default data from the first additional default data handling circuitry via the I/O cell and the first additional pin to the second communication counterpart device or receiving additional default data by the first additional default data handling circuitry via the first additional pin and the I/O cell from the second communication counterpart device. The method also includes monitoring, by the additional pin monitoring device, data traffic of additional default data passing via the first additional pin. The method also includes detecting, by said additional pin monitoring device, an additional function communication start signal in the data traffic. The method also includes, in response to detecting the additional function communication start signal in the data traffic, deactivating the default mode and activating the additional function mode, communicatively coupling the additional function data handling circuitry to the I/O cell, and transmitting additional function data from the additional function data handling circuitry via the I/O cell and the first additional pin to the second communication counterpart device or receiving additional function data by the additional function data handling circuitry via the first additional pin and the I/O cell from the second communication counterpart device.

In embodiments of the method of the fourth aspect, the method may further comprise at least one of the following method step sequences A) to D).

Method step sequence A) comprises:
in the default mode, configuring the I/O cell as an output driver for transmitting default data from first additional default data handling circuitry via the I/O cell and the first additional pin to the second communication counterpart device;
by the first communication device, initiating an additional communication for the additional function data handling circuitry and transmitting an additional function communication start signal via the first additional pin to the second communication counterpart device;
by said additional pin monitoring device, detecting the additional function communication start signal, deactivating the default mode and activating the additional function mode;
communicatively coupling the additional function data handling circuitry to the I/O cell;
by the additional function data handling circuitry, transmitting first additional function data via the I/O cell to the second communication counterpart device;
after transmitting the first additional function data from the additional function data handling circuitry to the second communication counterpart device, reconfiguring the I/O cell as an input cell, by the additional function data handling circuitry, receiving second additional function data via the I/O cell from the second communication counterpart device, and reconfiguring the I/O cell as an output driver; and
deactivating the additional function mode and activating the default mode.

Method step sequence B) comprises:
In the default mode, configuring the I/O cell as an input cell for transmitting default data from the second communication counterpart device via the first additional pin and the I/O cell to the first additional default data handling circuitry,
by the first communication device, initiating an additional communication for the additional function data handling circuitry and transmitting an additional function communication start signal via the first additional pin to the second communication counterpart device,
by said additional pin monitoring device, detecting the additional function communication start signal, deactivating the default mode and activating the additional function mode,
reconfiguring the I/O cell as an output driver,
communicatively coupling the additional function data handling circuitry to the I/O cell,
by the additional function data handling circuitry, transmitting first additional function data via the I/O cell to the second communication counterpart device;
after transmitting the first additional function data from the additional function data handling circuitry to the second communication counterpart device, reconfiguring the I/O cell as an input cell, by the additional function data handling circuitry, receiving second additional function data via the I/O cell from the second communication counterpart device, and
deactivating the additional function mode and activating the default mode.

Method step sequence C) comprises:
In the default mode, configuring the I/O cell as an input cell for transmitting default data from the second communication counterpart device via the first additional pin and the I/O cell to the first additional default data handling circuitry,
by the second communication counterpart device, initiating an additional function communication for the additional function data handling circuitry and transmitting an additional function communication start signal via the first additional pin to the first communication device,
by the additional pin monitoring device, detecting the additional function communication start signal, deactivating the default mode and activating the additional function mode,
reconfiguring the I/O cell as an output driver,
communicatively coupling the additional function data handling circuitry to the I/O cell, and
by the additional function data handling circuitry, transmitting first additional function data via the I/O cell to the second communication counterpart device;
after transmitting the first additional function data from the additional function data handling circuitry to the second communication counterpart device, reconfiguring the I/O cell as an input cell and, by the additional function data handling circuitry, receiving second additional function data via the I/O cell from the second communication counterpart device, and
deactivating the additional function mode and activating the default mode.

Method step sequence D) comprises:
In the default mode, configuring the I/O cell as an output driver for transmitting default data from the first additional default data handling circuitry via the I/O cell and the first additional pin to the second communication counterpart device,
by the second communication counterpart device, initiating an additional communication for the additional function data handling circuitry and transmitting an additional function communication start signal via the first additional pin to the first communication device,
by said additional pin monitoring device, detecting the additional function communication start signal, deactivating the default mode and activating the additional function mode, reconfiguring the I/O cell as an input cell,
communicatively coupling the additional function data handling circuitry to the I/O cell;
by the second communication counterpart device, transmitting first additional function data via the I/O cell to the additional function data handling circuitry;
after transmitting the first additional function data from the second communication counterpart device to the additional function data handling circuitry, reconfiguring the I/O cell as an output driver, and by the additional function data handling circuitry, transmitting second additional function data via the I/O cell to the second communication counterpart device, and
deactivating the additional function mode and activating the default mode.

In embodiments of the method of the fourth aspect, the method may further have at least one of the following steps:
configuring the I/O cell to operate as an additional input cell when the I/O cell is used to transmit additional function data from the second communication counterpart device to the additional function data handling circuitry;
configuring the I/O cell to operate as an additional output driver when the I/O cell is used to transmit additional function data from the additional function data handling circuitry to the second communication counterpart device;
by the first communication device, initiating an additional communication for the additional function data handling circuitry with the second communication counterpart device;
by the second communication counterpart device, initiating an additional communication communication for the additional function data handling circuitry with the second communication counterpart device;
in response to detecting the additional function communication start signal, stopping using the first additional pin in its default mode function of transmitting additional default data;
after having detected the additional function communication start signal and while using the I/O cell for transmitting additional function data, using the pins of the predetermined regular pinout without interruption in their standard mode function for transmitting and receiving regular data;
after having sent first additional function data via the I/O cell and the first additional pin and when second additional function data are not to be sent further to having sent the first additional function data, reconfiguring the first additional pin to be used in its function according to the default mode of transmitting additional default data;
after having sent first additional function data via the I/O cell and the first additional pin in a first direction and further after having sent second additional function data in a second direction opposite to the first direction via the I/O cell and the first additional pin, reconfiguring the first additional pin to be used in its function according to the default mode of transmitting default data;
the data bus is selected from one of the group that comprises a Controller Area Network, CAN, bus, a Local Interconnect Network, LIN, bus, and a FlexRay bus.

In embodiments of the method of the fourth aspect, the additional function communication start signal may be a pulse having at least one the following features: i) a predefined polarity, for example a raising leading edge and a falling trailing edge, or a falling leading edge and a raising trailing edge, and ii) a predefined pulse width, for example approximately 100 μs.

According to a fifth aspect of the present disclosure, there is provided a machine-readable, non-transitional storage medium storing a computer program product, or a computer program product, which comprises instructions, which when executed on a data processing system, such as a processor, a micro-processor, or a computer control or execute the method of the fourth aspect of the present disclosure.

BRIEF DESCRIPTION OF THE DRAWINGS

In the following, exemplary embodiment examples of the present disclosure are described in detail with reference to the appended drawings, in which:

FIG. 6 shows in its lower portion a schematic block diagram of a fourth embodiment example of a system according to the third aspect of the present disclosure, which comprises a first communication device and a second communication counterpart device, which are coupled communicatively by a regular bidirectional interface and by a plurality of n (with n<m) additional interconnections according to this disclosure.

For reasons of conciseness, features, which will be described with respect a particular figure, may not be described again, if they appear likewise or similarly in another figure.

DETAILED DESCRIPTION

Before exemplary embodiment examples of the present disclosure are described with reference to the figures (namely FIGS. 2 to 13), some general aspects of this disclosure as proposed by the present inventors shall still be explained.

Figure 1:
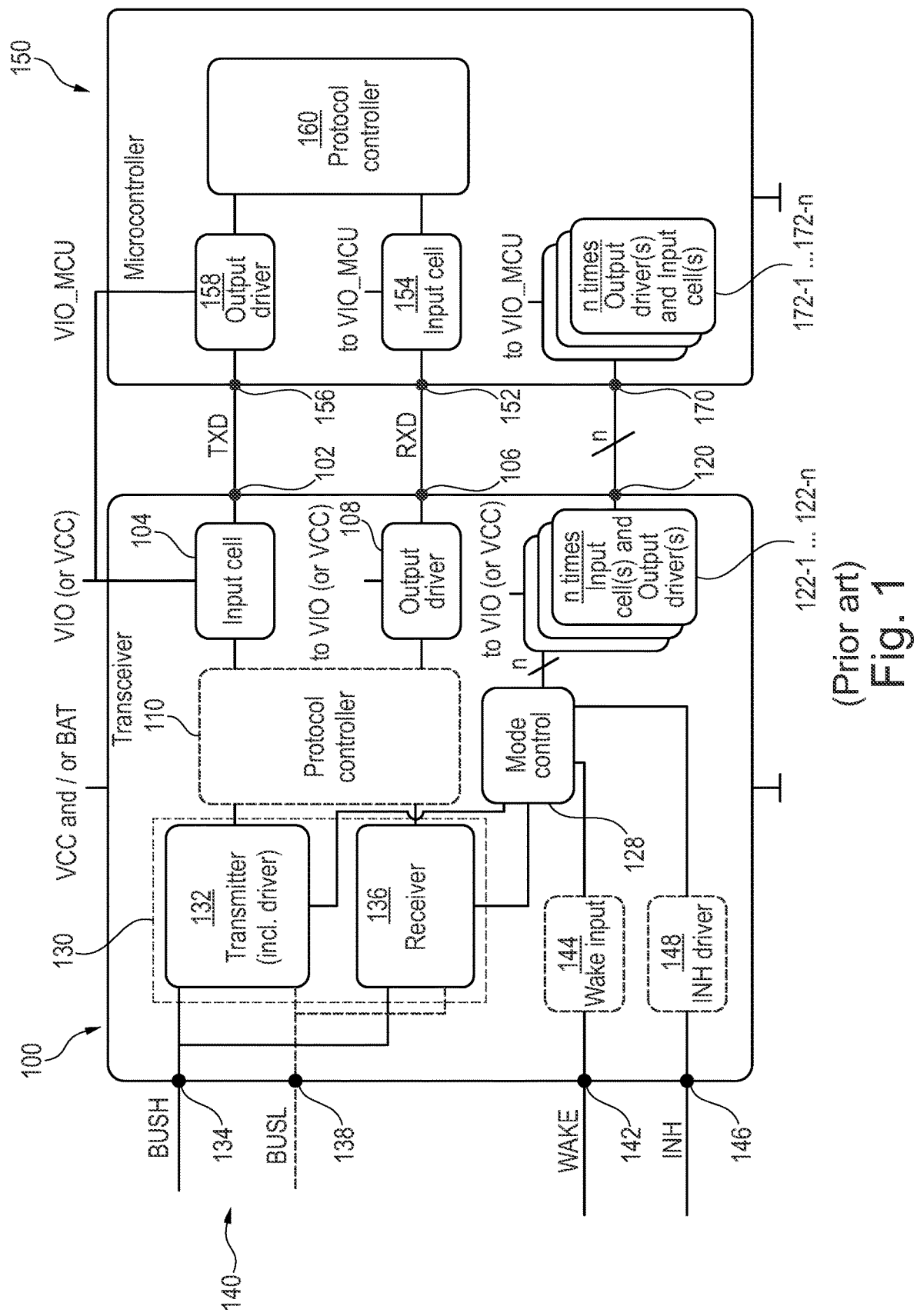
FIG. 1 shows a schematic block diagram of a conventional system, which comprises a conventional transceiver and a conventional microcontroller, and which is for transmitting and receiving regular data via a first bidirectional interface and for transmitting and receiving additional default data via a conventional additional bidirectional interface between the transceiver and the microcontroller.

FIG. 1 shows a schematic block diagram of a conventional system, which comprises a conventional transceiver 100 as an embodiment of a first communication device and a conventional microcontroller 150 as an embodiment of a second communication counterpart device, and which is for transmitting and receiving regular data via a first bidirectional interface 104, 108 and for transmitting and receiving additional default data via a conventional additional bidirectional interface 122-1, . . . , 122-n between the transceiver 100 and the microcontroller 150. The architecture of the transceiver 100 shown in FIG. 1 applies to at least CAN, LIN and FlexRay transceivers, which are commonly used in automotive applications.

The transceiver 100 comprises a predetermined pinout, including pins 102, 104 and 120. The pinout comprises a predetermined regular pinout 102, 106, which corresponds to the predetermined regular bidirectional interface configured to support regular bidirectional communication of regular data with the microcontroller 150, and a predetermined additional pinout 120, which corresponds to the predetermined additional bidirectional interface configured to support additional bidirectional communication of additional data with the microcontroller 150.

The predetermined regular pinout of the transceiver 100 comprises at least one transmitting pin 106 and at least one receiving pin 102. The regular bidirectional interface comprises at least one output driver 108 communicatively coupled to the at least one transmitting pin 106 and at least one input cell 104 communicatively coupled to the at least one receiving pin 102. The transceiver 100 may further comprise a regular communication control circuitry or protocol controller 110, which is communicatively coupled to the at least one output driver 108 and to the at least one input cell 104, and which is configured to transmit regular data via the at least one output driver 108 to, and receive regular data via the at least one input cell 104 from, the microcontroller 150.

The predetermined regular pinout of the transceiver 100 further has a first bus pin 134 (for example BUSH) and a second bus pin 138 (for example BUSL), both together forming a bus port and coupling to bus system 140. The transceiver 100 has a bus interface 130, which comprises a transmitter (including a driver) 132 communicatively coupled to the first bus pin 134, and a receiver 136 communicatively coupled to the second bus pin 138. The transceiver 100 is configured to receive bus transmit data from the microcontroller 150 via a TXD line, the input pin 102 and the input cell 104, and to transmit bus transmit data via the transmitter 132 and the first bus pin 134 to the bus system 140. The transceiver 100 is further configured to receive bus receive data from the bus system 140 via the second bus pin 138 and the receiver 136, and transmit the bus receive data via the output driver 108, the output pin 106 and a RXD line to the microcontroller 150. As such, the transceiver 100 acts as a buffer and as a level shifter between the microcontroller 150 and the bus system 140 implemented as a wiring harness, which connects to other modules (not shown) in the automotive application.

The predetermined additional pinout of the transceiver 100 comprises at least one additional pin 120, in particular plural additional pins. The associated predetermined additional bidirectional interface comprises at least one input cell/output driver or IO cell 122, in particular plural IO cells 122-1, . . . , 122-n. The additional data, which may be transmitted through the additional pin 120 and IO cell 122, may be mode control data, which may originate from the microcontroller 150 and be destined for a mode control device 128 (e.g. register and/or memory and/or controller) of the transceiver 100 for controlling a current mode of the transceiver 100.

The transceiver 100 shown in FIG. 1 also comprises a wake input pin 142 and a wake input device 144 coupled to the wake input pin 142 and capable to receive a wake signal via the wake input pin 142 and to transmit the wake signal to the mode control device 128. The transceiver 100 further comprises an inhibit pin 146 and an inhibit driver 148 coupled to the inhibit pin 146 and capable to receive an inhibit signal via the inhibit pin 146 and to transmit the inhibit signal to the mode control device 128. In view of this, the additional data, which may be transmitted through the IO cell 122 and the additional pin 120, may be mode control data, which may be forwarded from the mode control device 128 (e.g. register and/or memory and/or controller) of the transceiver 100 via an IO cell 122 and the associated additional pin 120 to the microcontroller 150 for reading out a current mode of the transceiver 100.

It is noted that in the transceiver shown in FIG. 1, some blocks, for example the wake input device 144, the inhibit driver 148, and the protocol controller 110 are optional. The protocol controller is typically not implemented in the transceiver, but in the microcontroller, as also indicated in FIG. 1 by the protocol controller 160. It is also possible that a protocol controller is partly implemented both in the transceiver (as block 110) as well as in the microcontroller (as block 160).

Further, reference is made to the supply connections VIO (or VCC) of the input cells 102, 122 and the output drivers 106, 122 in the transceiver 100 and the supply connections VIO_MCU of the input cells 152, 172 and the output drivers 158, 172 in the microcontroller 150. These may be supplied from a same supply, as is indicated by the interconnection between VIO (or VCC) of the transceiver 100 and VIO_MUC of the microcontroller 150 in FIG. 1.

It is recalled that the architecture of the transceiver 100 shown in FIG. 1 applies to at least CAN, LIN and FlexRay transceivers. A CAN, LIN or FlexRay transceiver 100 supports the communication of CAN, LIN or FlexRay messages, respectively. These messages can be transmitted by any node on the bus system network, and received messages from the bus system 140 are outputted via the output pin 106 and the RXD line to the local protocol controller 160 typically implemented in the microcontroller 150. It is also possible that the protocol controller 160 transmits a CAN, LIN or FlexRay message via the RXD line to the input pin 102, which will then be forwarded/transmitted to the bus system 140 by the transceiver.

To the knowledge of the inventors of the present disclosure, there are no transceivers available that support the communication of additional data (other than the CAN, LIN or FlexRay messages) between the transceiver 100 and the protocol controller 160 in the microcontroller 150 and/or the protocol controller 160 in the microcontroller 150 and the transceiver.

However, there is envisaged an upcoming need for the communication of additional data, which may be driven for example by (functional) security, functional safety, or new protocols such as CAN-XL. A difficulty is that for such additional data transfer, it is not possible to modify the pinout of the transceiver, since this pinout and package of present day's transceivers are (de facto) standardized. Also, a modification of the standardized CAN, LIN or FlexRay protocols is a difficult effort and would require updated CAN, LIN or FlexRay controllers, which is a cumbersome update of microcontrollers in many applications and should be avoided.

It is shown in FIG. 1 that each conventional transceiver 100 has at least one additional input and/or at least one additional out, refer to the additional pin 120 and the associated input cell/output driver, or briefly: IO cell, 122 in FIG. 1, which are typically used for communication of mode control and/or status information.

It is an essential operation principle of the present disclosure to reconfigure at least one or more additional digital interface pins (e.g. pin 120 in FIG. 1, like the pin 220 in FIG. 2) between a transceiver (considered as an embodiment of a generalized first communication device) and a microcontroller (considered as an embodiment of a generalized second communication counterpart device), and use these additional digital interface pins for additional communication between the transceiver and the microcontroller. Such additional digital interface pin (i.e. 120 in FIGS. 1 and 220 in FIG. 2) is additional to the "regular communication" digital pins (i.e. 102 and 106 in FIG. 1 as well as 202 and 206 in FIG. 2), which support the bus-data-related or regular communication between the transceiver and the microcontroller. In order to signal and indicate such reconfiguration, the microcontroller issues a start signal via the at least one additional digital interface pin, and the transceiver needs to detect this start signal indicating the start of the additional communication. Herein, the start signal may be a pulse, which may have a positive or negative polarity and a predefined, characteristic pulse width. In response to the detection of the start pulse, the actual additional communication between the transceiver and the microcontroller, e.g. from the transceiver to the microcontroller, can be started via the additional digital interface pin. It is then possible, as an option, that this is followed by an additional communication between the transceiver and the microcontroller in the opposite direction, e.g. from the microcontroller to the transceiver, via the same additional digital interface pin (or alternatively or in addition also via another additional digital interface pin).

Such use of at least one or more additional digital interface pins (see pin 220 in FIG. 2) for additional communication between the transceiver and the microcontroller is independent from the implementation of the regular or bus-data-related communication that makes use of the digital pins (i.e. pins 202 and 206 in FIG. 2) for the "regular" or bus-data-related communication. This means that the "regular" or bus-data-related communication is not disturbed or hampered by this additional interface (see pin 220 and 10 cell 222 in FIG. 2) for the additional communication, and that there is also no impact on the bus protocol.

Now turning to FIGS. 2 and 3, an exemplary embodiment example according to the first, second, and third aspect of the present disclosure will be described.

Figure 2:
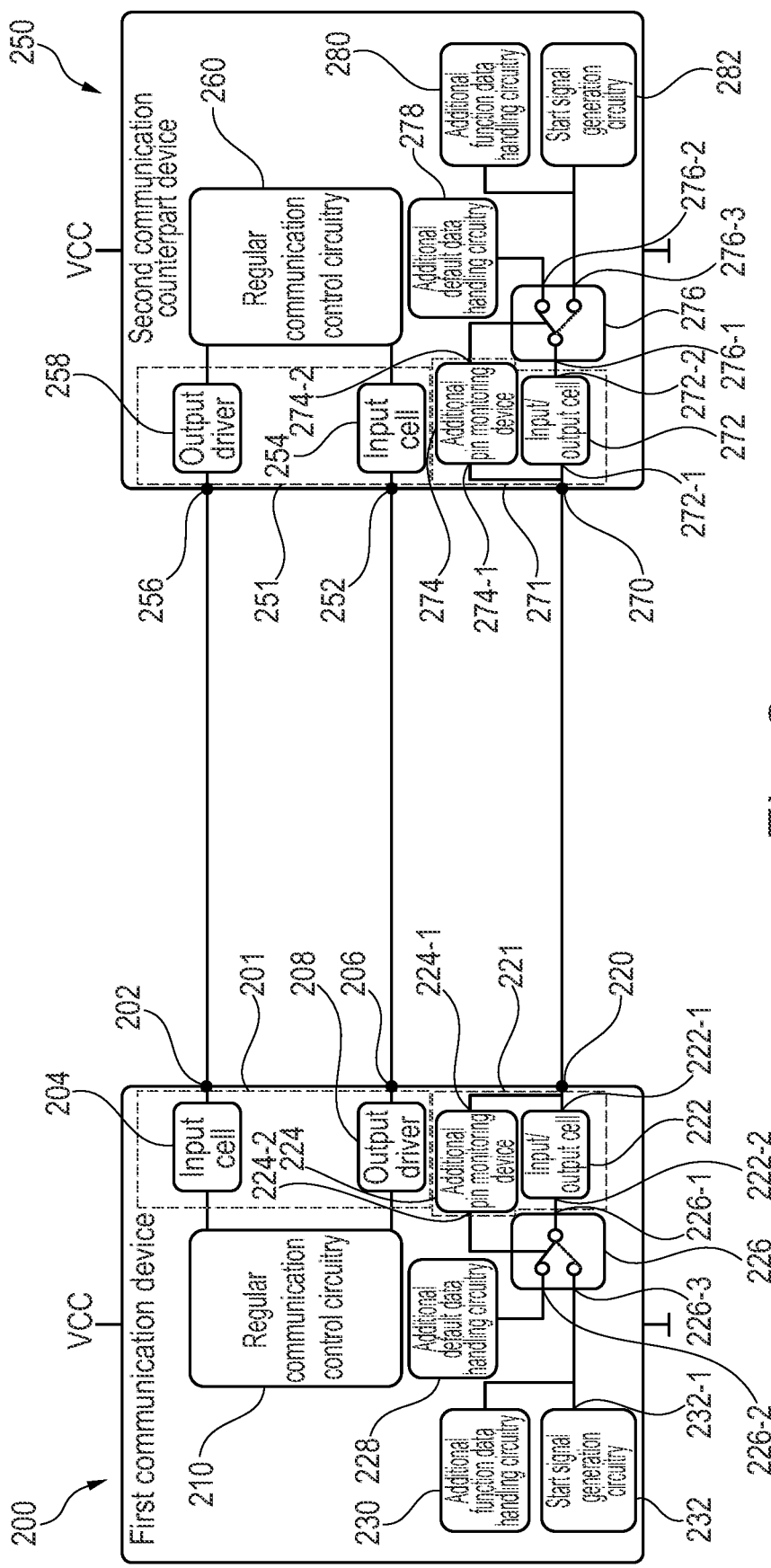
FIG. 2 shows a schematic block diagram of a first embodiment example of a system according to the third aspect of the present disclosure, which comprises a first communication device and a second communication counterpart device, and which is for transmitting and receiving regular data via a first bidirectional interface and for transmitting and receiving, in a serial manner, additional default data, or selectively additional function data, via an additional bidirectional interface according to this disclosure.

FIG. 2 shows a schematic block diagram of a first embodiment example of a system according to the third aspect of the present disclosure, which comprises a first communication device 200 and a second communication counterpart device 250, and which is for transmitting and receiving regular data via a first bidirectional interface and for transmitting and receiving, in a serial manner, additional default data, or selectively additional function data, via an additional bidirectional interface according to this disclosure.

Figure 3:
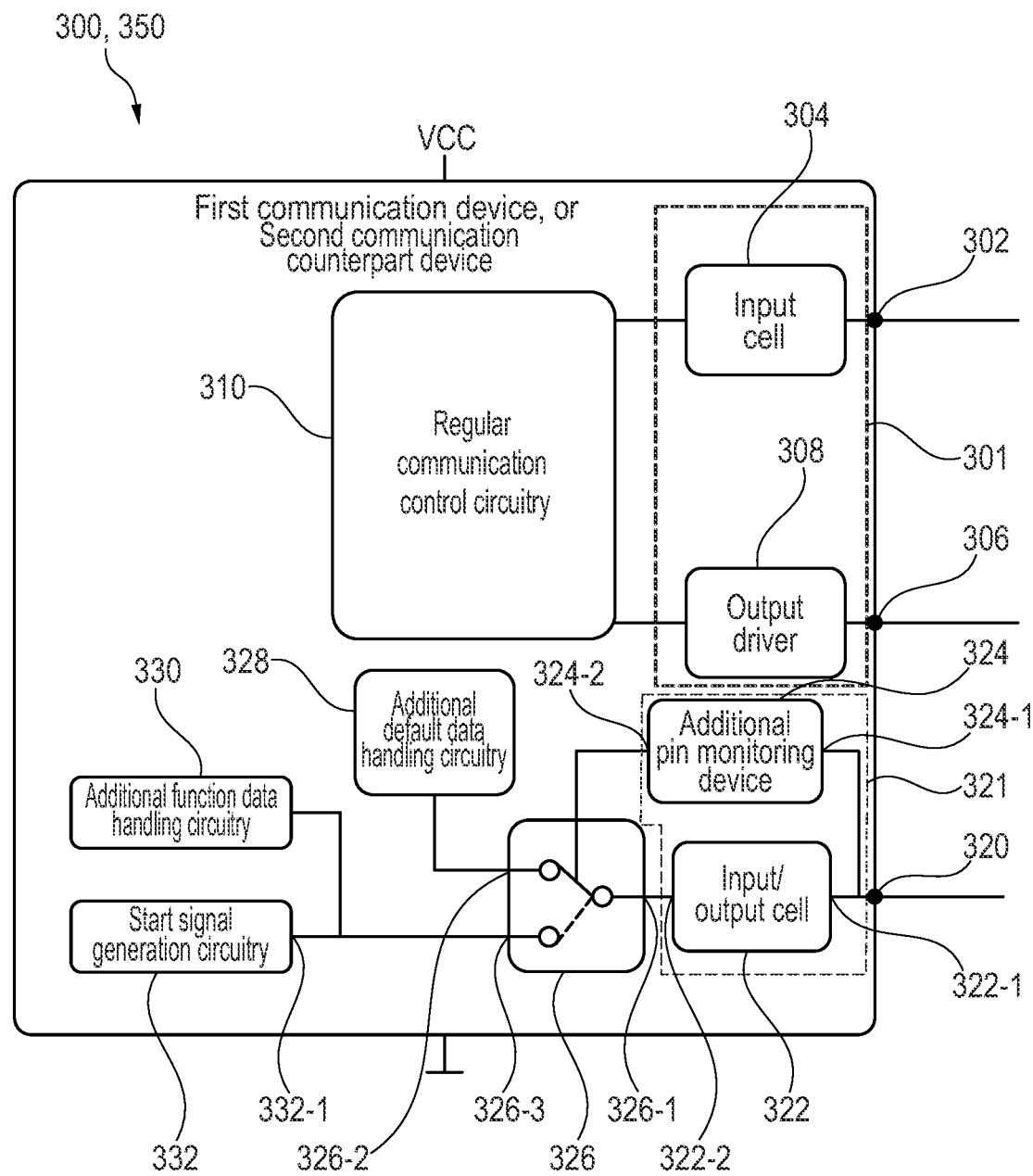
FIG. 3 shows a schematic block diagram of an embodiment example of a first communication device according to the first aspect of the present disclosure, which is for transmitting and receiving regular data via a first bidirectional interface and for transmitting and receiving, in a serial manner, additional default data, or selectively additional function data, via an additional bidirectional interface according to this disclosure.

FIG. 3 shows a schematic block diagram of an embodiment example of a first communication device 300 according to the first aspect of the present disclosure, which is for transmitting and receiving regular data via a first bidirectional interface and for transmitting and receiving, in a serial manner, additional default data, or selectively additional function data, via an additional bidirectional interface according to this disclosure.

A first communication device 200, 300 is generally configured for transmitting and receiving regular data via a first predetermined regular bidirectional interface 201, 301, respectively, to and from a second communication counterpart device 250, and for transmitting and receiving additional data via a first predetermined additional bidirectional interface 221, 321, respectively, to and from the second communication counterpart device 250. As such, the first communication device 200, 300 has (i) a predetermined pinout comprising a predetermined regular pinout (comprising the pins 202 and 206 in FIG. 2; and the pins 302 and 306 in FIG. 3), which corresponds to the predetermined regular bidirectional interface 201, 301 configured to support regular bidirectional communication of regular data with the second communication counterpart device 250, and (ii) a predetermined additional pinout (comprising the 220 in FIG. 2, and the pin 320 in FIG. 3), which corresponds to the predetermined additional bidirectional interface 221, 321 configured to support additional bidirectional communication of additional data with the second communication counterpart device 250.

The first communication device 200, 300 may be embodied as a transceiver, such as a transceiver 700 (see FIG. 7) according to the CAN standard, a transceiver 800 (see FIG. 8) according to the LIN standard, and a transceiver 900 (see FIG. 9) according to the FlexRay standard. The second communication counterpart device 250 may be a microcontroller, such as a microcontroller containing a CAN controller according to the CAN standard (see the element 250, 450, 550, and 650, respectively in FIGS. 2, 4, 5, and 6), a microcontroller containing a LIN controller according to the LIN standard (not shown), and a microcontroller containing a FlexRay controller according to the FlexRay standard (not shown).

The additional pinout comprises at least a first additional pin 220, 230. The corresponding additional bidirectional interface 221, 321 comprises a first input/output, I/O, cell 222, 322, which has a first input 222-1, 322-1 that is communicatively coupled to the first additional pin 220, 320 and a first output 222-2, 322-2. The first I/O cell 222, 322 is configurable to operate either as a first additional output driver or as a first additional input cell.

The first communication device 200, 300 has a first additional default data handling circuitry 228, 328, which is communicatively coupled to the first output 222-2, 322-2 of the first I/O cell 222, 322, and which is configured to transmit and receive additional default data via the additional bidirectional interface 221, 321, when a default mode is active. In the case of the device 200, 300 being a transceiver and the device 250 being a microcontroller, the additional default data may be mode control data and/or status information data.

According to the first aspect of the present disclosure, the additional bidirectional interface 221, 321 of the first communication device 200, 300 can operate in the afore-mentioned default mode and in an additional function mode.

Moreover according to the first aspect of the present disclosure, the first communication device 200, 300 further has a first additional function data handling circuitry 230, 330, which is communicatively coupled to the first output 222-2, 322-2 of the first I/O cell 222, 322, and which is configured to transmit and receive additional function data via the additional bidirectional interface 221, 321, when an additional function mode is active. The additional function data may any kind of data, which is to be communicated in addition to the regular (or bus-related) data. This may for example be security data, (functional) safety data, or data related to new protocols such as CAN-XL, or still different types of data.

The first communication device 200, 300 shown in FIGS. 2 and 3 further has an additional pin monitoring device 224, 324, which is communicatively coupled to the first additional pin 220, 320, and which is configured to monitor data traffic via the first additional pin 220, 320. The additional pin monitoring device 224, 324 is configured to detect an additional function communication start signal present in the data traffic of additional default data received via the first additional pin 220, 320, and is further configured to deactivate the default mode and to activate the additional function mode, when an additional function communication start signal is detected in the data traffic of additional default data received via the first additional pin 220, 320.

The additional pin monitoring device 224, 324 is further configured to generate a mode indication signal, which is configured to indicate that the additional function mode is active, when an additional function communication start signal is detected in the data traffic of additional default data received via the first additional function pin 220, 320, and which is configured to indicate that the default mode is active, when the additional function mode is deactivated.

By the additional pin monitoring device 224, 324, it is possible that the second communication counterpart device 250 (see also elements 450, 550, and 650 in FIGS. 4, 5, and 6) is capable to initiate an additional bidirectional communication involving additional function data. Accordingly, the first communication device 200, 300 (see also elements 400, 500, and 600 in FIGS. 4, 5, and 6) is configured to handle the additional bidirectional communication for the additional function data handling circuitry 230, 330 (see also elements 430-1 ... 430-n, 530-1 ... 530-n, and 630-1 ... 630-n in FIGS. 4, 5, and 6) with the second communication counterpart device 250.

In this embodiment, the first communication device 200, 300 has a first switch device 226, 326. The first switch device 226, 326 comprises an input 226-1, 326-1, which is communicatively coupled to the first output of the first I/O cell 222, 322, a first output 226-2, 326-2 which is communicatively coupled to the first additional default data handling circuitry 228, 328, and a second output 226-3, 326-3, which is communicatively coupled to the first additional function data handling circuitry 230, 330. Moreover, the first switch device 226, 326 is configured to be controllable by the mode indication signal. In response to the mode indication signal, the first switch device 226, 326 communicatively couples its input 226-1, 326-1 to its first output 226-2, 326-2, when the mode indication signal indicates that the default mode is active, and communicatively couples its input 226-1, 326-1 to its second output 226-3, 326-3, when the mode indication signal indicates that the additional function mode is active.

The first communication device 200, 300 shown in FIGS. 2 and 3 further has a start signal generation circuitry 232, 332. The start signal generation circuitry 232, 332 has a first output 232-1, 332-1, and is capable to generate an additional function communication start signal and to output a generated additional function communication start signal via its first output 232-1, 332-1. The first output 232-1, 332-1 is communicatively coupled to the second output 226-3, 326-3 of the switch device 226, 326, so that the first communication device 200, 300 is capable to transmit an additional function communication start signal through the first I/O cell 222, 322 and via the first additional pin 220, 320, when the first switch device 226, 326 is controlled to couple its input 226-1, 326-1 to its second output 226-3, 326-3.

It is noted that the second communication counterpart device 250 has blocks and functionality that correspond to the constitution and the functionality of the first communication device 200. As such, the second communication counterpart device 250 comprises a predetermined pinout comprising a predetermined regular pinout 252, 256, which corresponds to the predetermined regular bidirectional interface 251 configured to support regular bidirectional communication of regular data with the second communication counterpart device 250, and a predetermined additional pinout 220, which corresponds to the predetermined additional bidirectional interface 271 configured to support additional bidirectional communication of additional data with the first communication counterpart device 200.

In regard of the predetermined additional bidirectional interface 271, the second communication counterpart device 250 comprises a first additional pin 258, which corresponds in functionality to the first additional pin 220 of the first communication counterpart device 200; an IO cell 272, which corresponds in functionality to the IO cell 222 of the first communication counterpart device 200; a first additional pin 258, which corresponds in functionality to the first additional pin 220 of the first communication counterpart device 200; an additional pin monitoring device 274, which corresponds in functionality to the additional pin monitoring device 224 of the first communication counterpart device 200; a switch device 276, which corresponds in functionality to the switch device 226 of the first communication counterpart device 200; an additional default data handling device 278, which corresponds in functionality to the additional default data handling device 228 of the first communication counterpart device 200; an additional function data handling device 280, which corresponds in functionality to the additional function data handling device 230 of the first communication counterpart device 200; and a start signal generation device 282, which corresponds in functionality to the start signal generation device 232 of the first communication counterpart device 200.

While the second communication counterpart device 250 has blocks and functionality that correspond to the blocks and functionality of the first communication device 200, the constitution of the blocks of the second communication counterpart device 250 may be different from the constitution of the blocks of the first communication device 200. In the first communication device 200, the blocks/elements 204, 208, 210, 222, 224, 226, 228, 230, and 232 may be embodied in hardware as circuitry, the corresponding blocks/elements 254, 258, 270, 272, 274, 276, 278, 280, and 282 of the second communication counterpart device 250 may not be embodied in hardware, but may at least partly, in particular in total, be embodied in software, for example as software modules, which may be executed by a data processing unit.

The additional function communication start signal may be a pulse having at least one of the following features: a predefined polarity, for example a raising leading edge and a falling trailing edge, or a falling leading edge and a raising trailing edge. Also, the start pulse may have a predefined pulse width, for example approximately 100 μs.

Figure 4:
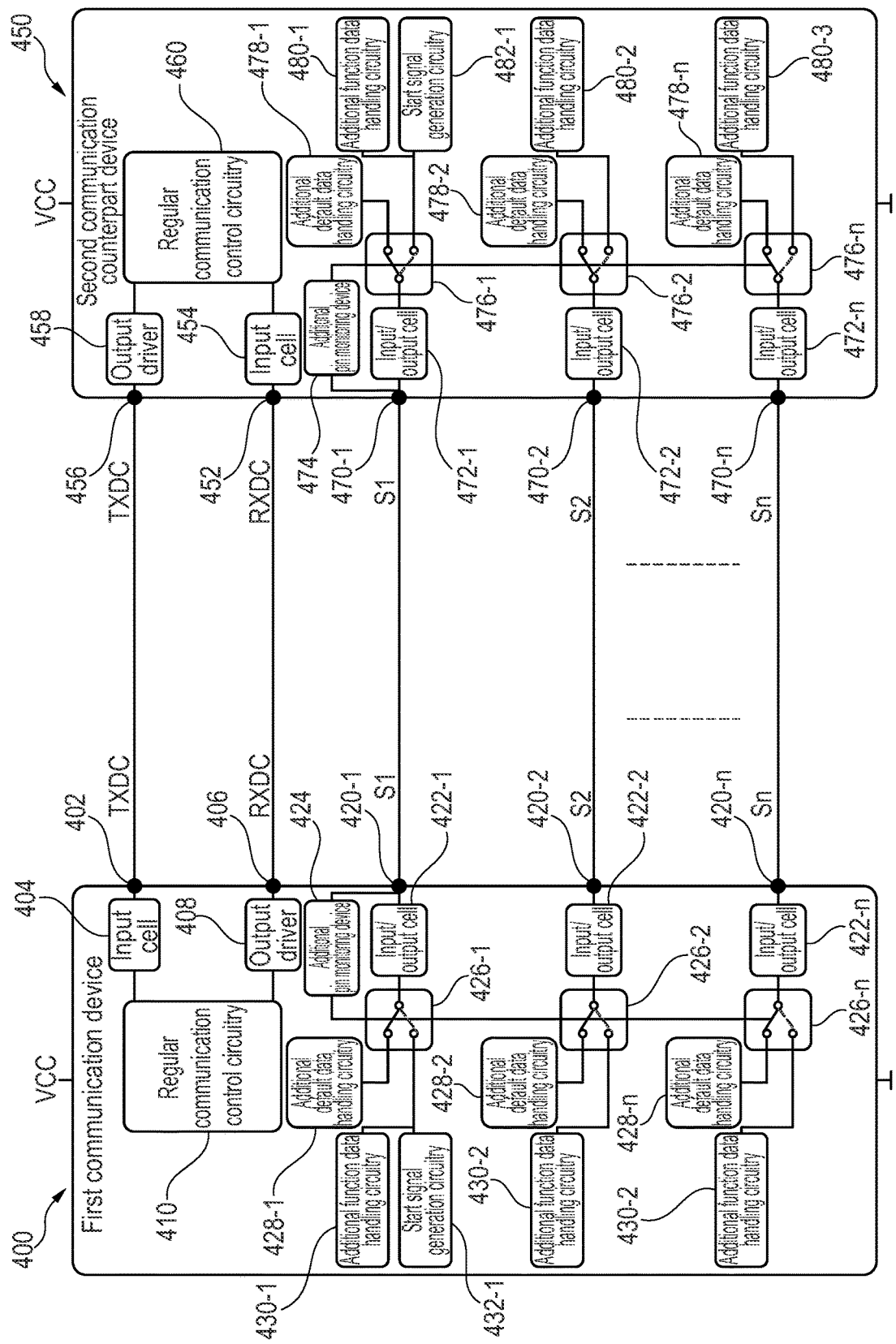
FIG. 4 shows a schematic block diagram of a second embodiment example of a system according to the third aspect of the present disclosure, which comprises a first communication device and a second communication counterpart device, and which is for transmitting and receiving regular data via a first bidirectional interface and for transmitting and receiving, in a parallel manner, additional default data, or selectively additional function data, via an additional bidirectional interface according to this disclosure.
Figure 5:
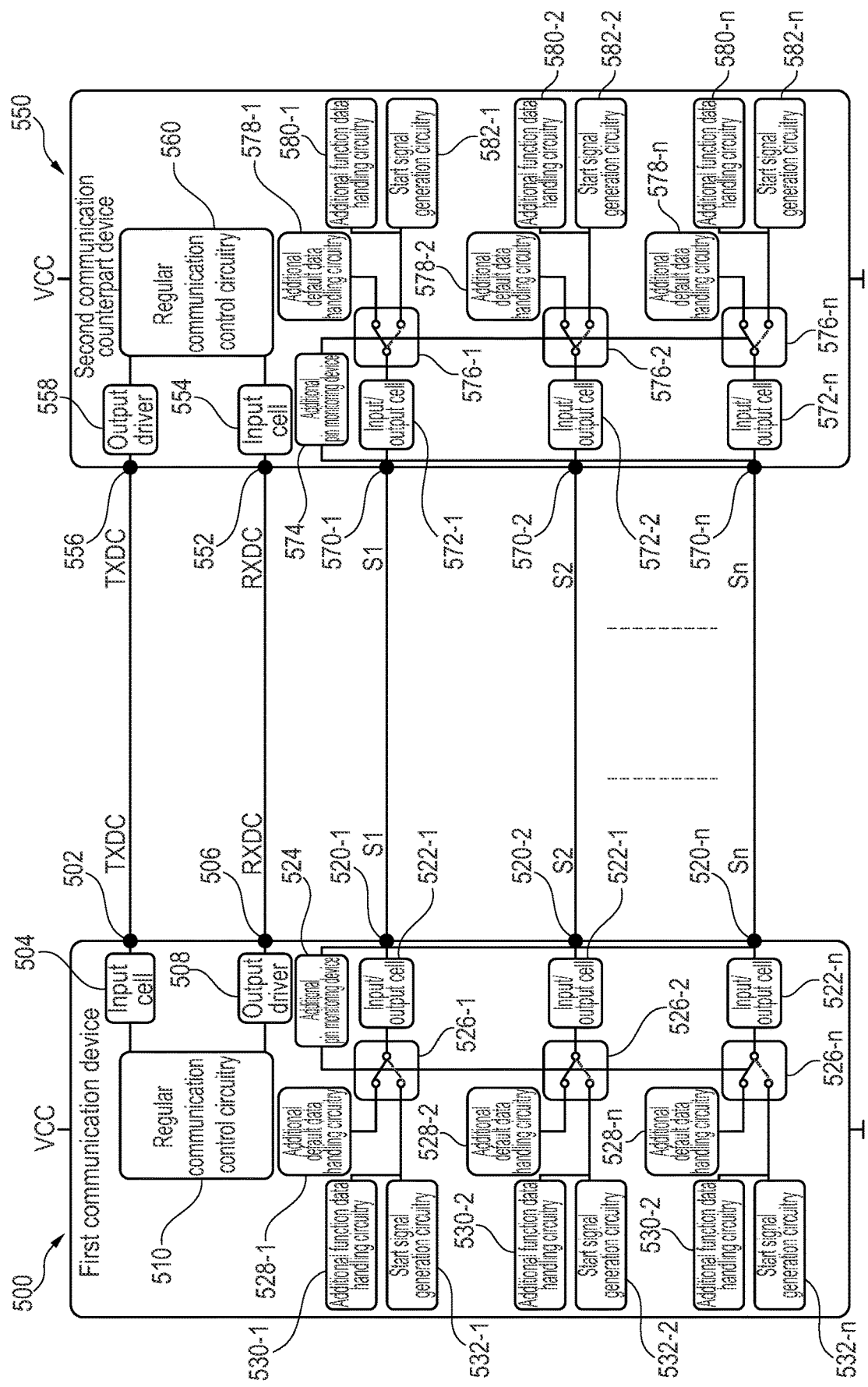
FIG. 5 shows a schematic block diagram of a third embodiment example of a system according to the third aspect of the present disclosure, which comprises a first communication device and a second communication counterpart device, and which is for transmitting and receiving regular data via a first bidirectional interface and for transmitting and receiving, in a parallel manner, additional default data, or selectively additional function data, via an additional bidirectional interface according to this disclosure.
Figure 6:
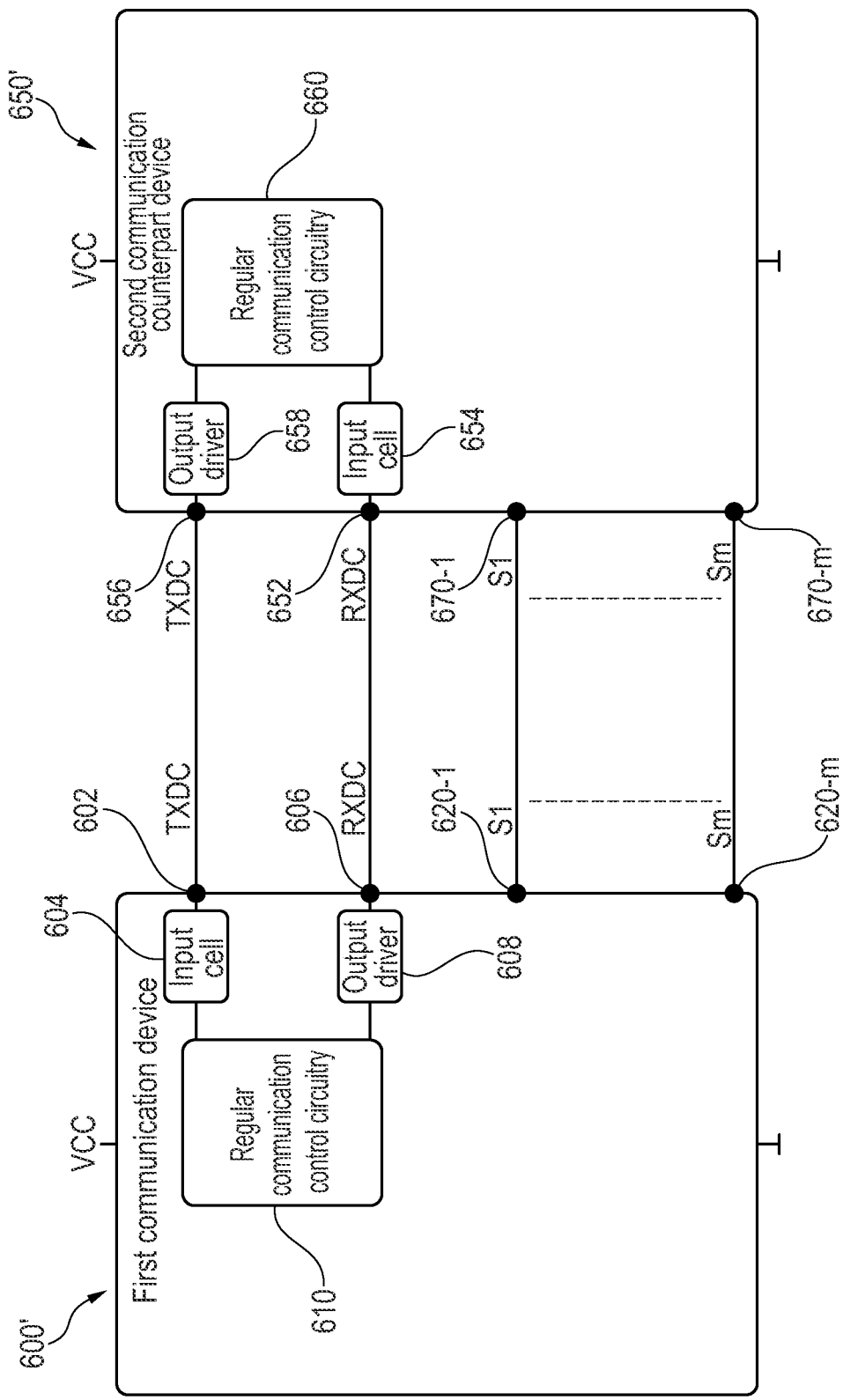
FIG. 6 shows in its upper portion a schematic block diagram of a conventional system, which comprises a conventional first communication device and a conventional second communication counterpart device, which are conventionally coupled communicatively by a regular bidirectional interface and by a plurality of m conventional additional interconnections. In addition.
Figure 6:
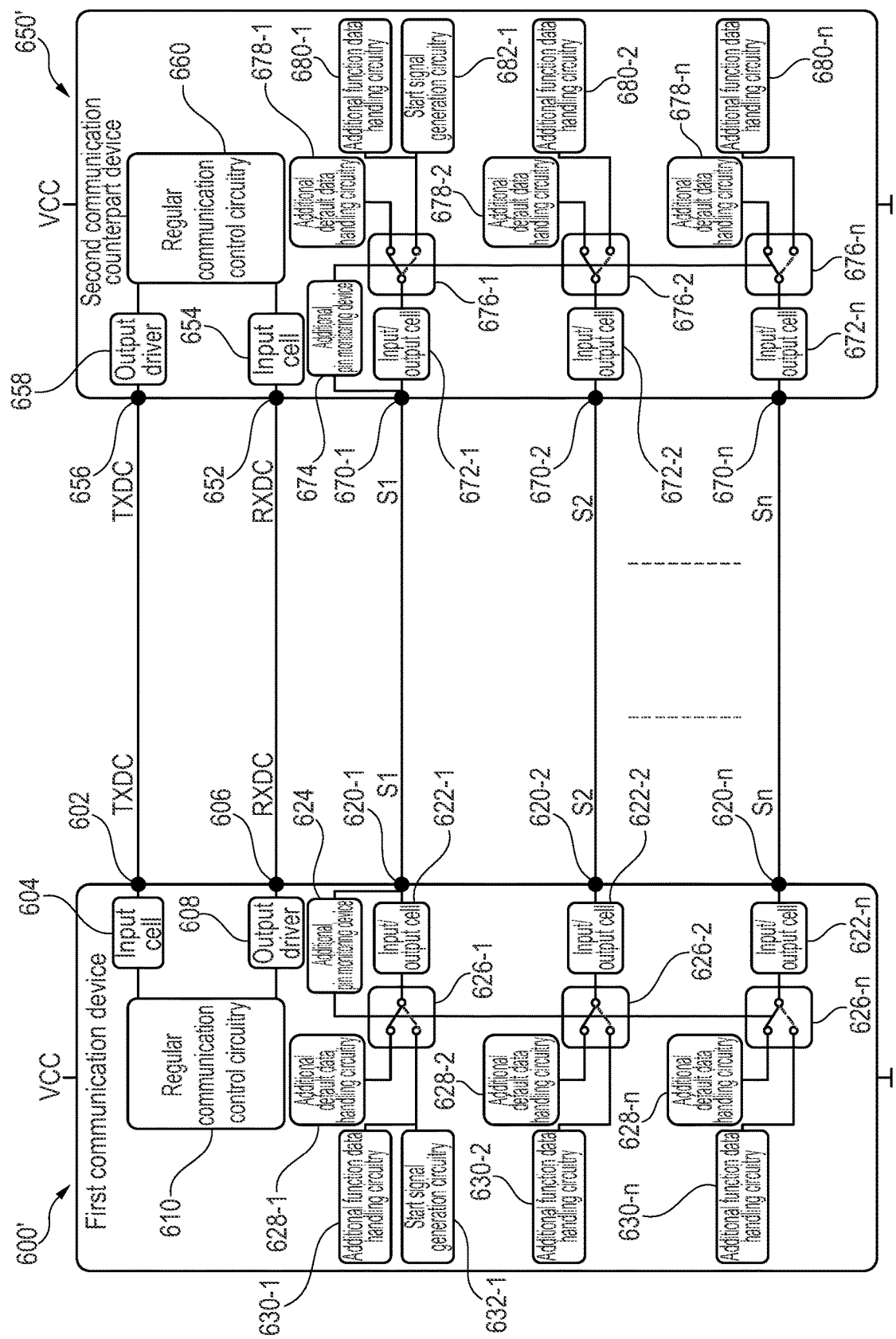

By the start signal generation circuitry 232, 332 of the first communication device 200, 300, it is possible that the first communication device 200, 300 (see also elements 400, 500, and 600 in FIGS. 4, 5, and 6) is capable to initiate an additional bidirectional communication involving additional function data for the additional function data handling circuitry 230, 330 (see also elements 430-1, . . . , 430-n, 530-1, . . . , 530-n, and 630-1, . . . , 630-n in FIGS. 4, 5, and 6) with the second communication counterpart device 250 (see also elements 450, 550, and 650 in FIGS. 4, 5, and 6). In this embodiment, the system including the first communication device 200, 300 and the second communication counterpart device 250, 350 may be operated according to one of the following operation configurations A) and B).

In operation configuration A) of the system according to the third aspect of the present disclosure, after initiation of the additional bidirectional communication by the first communication device, the I/O cell 222, 322 (see also the elements 422-1 . . . 422-n, 522-1 . . . 522-n, and 622-1 . . . 622-n in FIGS. 4, 5, and 6) can be configured as an output driver, and the additional function data handling circuitry 230, 330 (see also the elements 430-1 . . . 430-n, 530-1 . . . 530-n, and 630-1 . . . 630-n in FIGS. 4, 5, and 6) can be configured to transmit first additional function data via the I/O cell 222, 322 to the second communication counterpart device 250 (see also the elements 450, 550, and 650 in FIGS. 4, 5, and 6). Then, after transmitting the first additional function data from the additional function data handling circuitry 230, 330 to the second communication counterpart device 250, the I/O cell 222, 322 can be reconfigured as an input cell, and the additional function data handling circuitry 230, 330 can be reconfigured to receive second additional function data via the I/O cell 222, 322 from the second communication counterpart device 250.

In operation configuration B) of the system according to the third aspect of the present disclosure, after initiation of the additional bidirectional communication by the first communication device, the I/O cell 222, 322 (see also the elements 422-1 . . . 422-n, 522-1 . . . 522-n, and 622-1 . . . 622-n in FIGS. 4, 5, and 6) can be configured as an input cell, and the additional function data handling circuitry 230, 330 (see also the elements 430-1 . . . 430-n, 530-1 . . . 530-n, and 630-1 . . . 630-n in FIGS. 4, 5, and 6) can be configured to receive first additional function data via the I/O cell 222, 322 from the second communication counterpart device 250 (see also the elements 450, 550, and 650 in FIGS. 4, 5, and 6). Then, after receiving the first additional function data by the additional function data handling circuitry 230, 330 from the second communication counterpart device 250, the I/O cell 222, 322 can be reconfigured as an output driver, and the additional function data handling circuitry 230, 330 can be reconfigured to transmit second additional function data via the I/O cell 222, 322 to the second communication counterpart device 250.

It is recalled that the second communication counterpart device 250 has blocks and functionality that correspond to the blocks and functionality of the first communication device 200. Accordingly, the second communication counterpart device 250 has, by itself, a start signal generation circuitry 282. By the start signal generation circuitry 282, it is possible that the second communication device 250 (see also elements 450, 550, and 650 in FIGS. 4, 5, and 6) is capable to initiate an additional bidirectional communication involving additional function data for the additional function data handling circuitry 280 (see also elements 480-1, ..., 480-n, 580-1, ..., 580-n, and 680-1, ..., 680-n in FIGS. 4, 5, and 6) with the first communication counterpart device 200. In this embodiment, the system including the second communication counterpart device 250 and the first communication device 200, 300 may be operated according to one of the following operation configurations C) and D).

In operation configuration C) of the system according to the third aspect of the present disclosure, after an initiation of the additional bidirectional communication by the second communication counterpart device 250 (see also elements 450, 550, and 650 in FIGS. 4, 5, and 6), the I/O cell 272 can be configured as an input cell, and the additional function data handling circuitry 280 can be configured to receive first additional function data via the I/O cell 272 from the first communication counterpart device 200. Then, after receiving the first additional function data from the first communication counterpart device 200 (or elements 400, 500, and 600 in FIGS. 4, 5, and 6) by the additional function data handling circuitry 280, the I/O cell 272 can be reconfigured as an output driver, and the additional function data handling circuitry 280 can be configured to transmit second additional function data via the I/O cell 272 to the first communication counterpart device 200.

In operation configuration D) of the system according to the third aspect of the present disclosure, after an initiation of the additional bidirectional communication by the second communication counterpart device 250 (see also elements 450, 550, and 650 in FIGS. 4, 5, and 6), the I/O cell 272 can be configured as an output driver, and the additional function data handling circuitry 280 can be configured to transmit first additional function data via the I/O cell 272 to the first communication counterpart device 200. Then, after transmitting the first additional function data to the first communication counterpart device 200 (or elements 400, 500, and 600 in FIGS. 4, 5, and 6) by the additional function data handling circuitry 280, the I/O cell 272 can be reconfigured as an input cell, and the additional function data handling circuitry 280 can be configured to receive second additional function data via the I/O cell 272 from the first communication counterpart device 200.

The first communication device 200, 300 may be a memory device, and the second communication counterpart device 250 may be selected from a group including a corresponding processing device, a corresponding digital signal processor, and a corresponding microcontroller. Or, vice versa, the first communication device 200, 300 may be selected from a group including a corresponding processing device, a corresponding digital signal processor, and a corresponding microcontroller, and the second communication counterpart device 250 may be a corresponding memory device.

FIG. 4 shows a schematic block diagram of a second embodiment example of a system according to the third aspect of the present disclosure, which comprises a first communication device 400 and a second communication counterpart device 450, and which is for transmitting and receiving regular data via a first bidirectional interface and for transmitting and receiving, in a parallel manner, additional default data, or selectively additional function data, via an additional bidirectional interface according to this disclosure.

In the first communication device 400 shown in FIG. 4, the additional pinout has at least one further additional pin 420-2, and in particular a plurality of further additional pins 420-2, ..., 420-n. In these embodiments, the corresponding additional bidirectional interface further comprises at least one further I/O cell 422-2, in particular a plurality of further I/O cells 422-2, ..., 422-n. Each one of the further IO cells 422-2, ..., 422-n has a further input and a further output and is configurable to operate either as a further additional output driver or as a further additional input cell. Each one of the further inputs of the further I/O cells 422-2, ..., 422-n is communicatively coupled to a corresponding one of the further additional pins 420-2, ..., 420-n.

Moreover, the first communication device 400 shown in FIG. 4 has at least one further additional default data handling circuitry 428-2, in particular a plurality of further additional default data handling circuitries 428-2, ..., 428-n. Each one of the additional default data handling circuitries 428-2, ..., 428-n is communicatively coupled to a corresponding one of the further outputs of the further I/O cells 422-2, ..., 422-n, and is configured to transmit and receive additional default data via the additional bidirectional interface, when the default mode is active.

Still further, the first communication device 400 shown in FIG. 4 has at least one further additional function data handling circuitry 430-2, in particular a plurality of further additional function data handling circuitries 430-2, ..., 430-n. Each one of the further additional function data handling circuitries 430-2, ..., 430-n is communicatively coupled to a corresponding one of the further outputs of the further I/O cells 422-2, ..., 422-n, and is configured to transmit and receive additional function data via the additional bidirectional interface, when the additional function mode is active.

The provision of plural additional pins 420-1, ... 420-n, plural associated IO cells 422-1, ... 422-n, plural associated additional default data handling circuitries 428-1, ... 428-n, and plural associated additional functional data handling circuitries 430-1, ... 430-n as shown in FIG. 4 enables a parallel transmission of additional data (additional default data, and additional function) via the additional interface, hence a higher overall data transmission rate and/or a higher bandwidth over the additional interface, and thus sets aside a limitation of the embodiments shown in FIGS. 2 and 3, wherein due to the limitation to only one additional pin 220, 320 only a serial transmission of additional data is possible over the only one additional pin 220, 320.

Like the first communication devices 200, 300 shown in FIGS. 2 and 3, also the first communication device 400 shown in FIG. 4 further has at least one further switch device 426-2, in particular a plurality of further switch devices 426-2, ..., 426-n. Each one of the plurality of further switch devices 426-2, ..., 426-n comprises an input, which is communicatively coupled to the further output of a corresponding further I/O cell 422-2, ..., 422-n, a first output, which is communicatively coupled to the corresponding further additional default data handling circuitry 428-2, ..., 428-n, and a second output, which is communicatively coupled to the corresponding further additional function data handling circuitry 430-2, ..., 430-n. In such embodiments, each one of the further switch devices 426-2, ..., 426-n may be configured to be controllable by the mode indication signal. Accordingly, each one of the further switch devices 426-2, ..., 426-n can communicatively couple its input to its first output, when the mode indication signal indicates that the default mode is active, and can communicatively couple its input to its second output, when the mode indication signal indicates that the additional function mode is active.

The provision of plural further switching devices 426-2, ..., 426-n, one associated to each further additional pin 420-2, ..., 420-n or associated transmission channel, allows to switch independently in each transmission channel the destination of the transmitted additional data, viz additional default data to the additional default data handling circuitry 428-2, ..., 428-n, and additional function data to the additional function data handling circuitry 430-2, ..., 430-n.

FIG. 5 shows a schematic block diagram of a third embodiment example of a system according to the third aspect of the present disclosure, which comprises a first communication device 500 and a second communication counterpart device 550, and which is for transmitting and receiving regular data via a first bidirectional interface and for transmitting and receiving, in a parallel manner, additional default data, or selectively additional function data, via an additional bidirectional interface according to this disclosure.

In the first communication device 500 shown in FIG. 5, the additional pin monitoring device 524 is communicatively coupled to each one of the further additional pins 520-1, ..., 520-n. The additional pin monitoring device 524 is configured to monitor data traffic via each one of the further additional pins 520-1, ..., 520-n, and as such is configured to detect an additional function communication start signal or at least a portion of an additional function communication start signal present in the data traffic of additional default data received via a respective one of the further additional pins 520-1, ..., 520-n. Also, the additional pin monitoring device 524 is configured to deactivate the default mode and to activate the additional function mode, when an additional function communication start signal or at least a portion of an additional function communication start signal is detected in the data traffic of additional default data received via any one of the further additional pins 520-1, ..., 520-n. In an alternative embodiment, the additional pin monitoring device 524 is configured to deactivate the default mode and to activate the additional function mode when at least a first portion of an additional function communication start signal is detected in the data traffic of additional default data received via a first one of the further additional pins 520-1, ..., 520-n and at least a second portion of an additional function communication start signal is detected in the data traffic of additional default data received via a second one of the further additional pins 520-1, ..., 520-n.

The communicatively coupling of the additional pin monitoring device 524 to each one of the further additional pins 520-1, ..., 520-n enables to implement, or "distribute", the additional function communication start signal over plural parallel transmission channels. In other words, the additional function communication start signal can be implemented on multiple additional pins 520-1, ..., 520-n as well. This allows to make the pulse detection less sensitive to interference or false detection based on interference. When by contrast using only one of the additional pins, e.g. pin 220 and 320 in FIGS. 2 and 3, for transmitting the start pulse, the start pulse would have to be extended to a pulse sequence in order to reduce interference, however that would make the start pulse longer. The start pulse can be based on a pattern instead of only a single pulse. Using the multiple further additional pins 520-1, ..., 520-n for parallel transmission of (portions of) the start pulse allows a more robust start signal detection mechanism. The pulse pattern may be implemented in parallel, rather than only serially as would be the case when using only one additional pin to transmit the start pulse. This allows a more reliable pulse detection without sacrificing on the overall pulse length.

FIG. 6 shows in its upper portion a schematic block diagram of a conventional system, which comprises a conventional first communication device 600' and a conventional second communication counterpart device 650', which are conventionally coupled communicatively by a regular bidirectional interface (604↔654, 608↔658) and by a plurality of m conventional additional interconnections 620-i↔670-i (for i=1 to m). In addition, FIG. 6 shows in its lower portion a schematic block diagram of a fourth embodiment example of a system according to the third aspect of the present disclosure, which comprises a first communication device 600 and a second communication counterpart device 650, which are coupled communicatively by a regular bidirectional interface (604↔654, 608↔658) and by a plurality of n (with n<m) additional interconnections 620-j↔670-j (for j=1 to n) according to this disclosure.

FIG. 6 is to illustrate that an implementation of plural additional bidirectional interfaces, which enable additional communication with additional function data according to this disclosure, between the two devices 600 and 650 allows to reduce the number of additional interconnections, or in other words allows to reduce the wire count, from m to n (with n<m) in the shown example.

The upper portion of FIG. 6 shows a conventional system having m conventional additional interconnections 620-1↔670-1, ..., 620-m↔670-m. Each one of the m conventional additional interconnections allows transmission of additional default data (e.g. mode control data and/or status information data) only.

The lower portion of FIG. 6 shows a system according the third aspect of this disclosure, having n additional interconnections 620-1↔670-1, ..., 620-n↔670-n according to this disclosure, wherein n<m. Each one of the n additional interconnections according to this disclosure allows, in addition to the transmission of additional default data, also the transmission of additional function data. When the teaching of this disclosure of using additional (function) data on an available interconnection is applied on an available interconnection, the teaching of this disclosure can be applied such that the overall number of interconnection (or the wire count) can be reduced to n interconnections (or n wires).

In the most extreme case, the number n of interconnections (or wires) may equal one (i.e. n=1). This could for example be the case when data on the m interconnections toggle rarely and thereby use an extremely low bandwidth.

Another example might be that a partial number k (with k<m), for example k=3, of the m conventional interconnections require a high bandwidth connection and are therefore not changed according to the teaching of this disclosure, while the other m-k interconnections make use of the teaching of this disclosure and thereby reduce that number interconnections, wherein the other m-k interconnections could be reduced to one. As a concrete example, of m=6 conventional interconnections, k=3 may require a high bandwidth and are not changed, while the other (m-k)=(6-3)=3 interconnections apply the teaching of this disclosure and are reduced to one. In this example, the overall number of interconnections equals 4 (n=4).

An according example is illustrated in FIG. 6. The interconnection 620-1↔670-1 has applied the teaching of this disclosure and is reduced to one, while the interconnection 620-2↔670-2, . . . , 620-n↔670-n require a high bandwidth and have not been changed.

Figure 7:
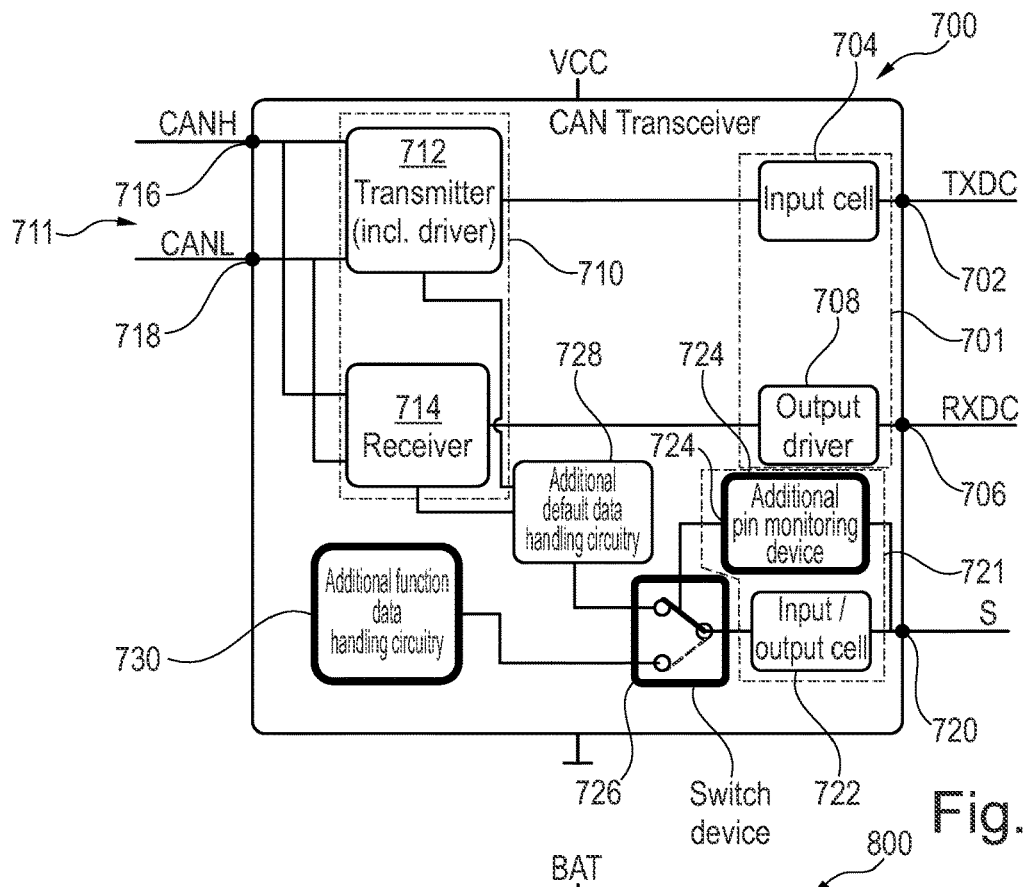
FIG. 7 shows a schematic block diagram of a transceiver according to the first aspect of the present disclosure and according to the CAN standard, which is for transmitting regular data to, and receiving regular data from, a CAN bus via a first bidirectional interface according to the CAN standard and for transmitting and receiving, in a serial manner, additional default data, or selectively additional function data, via an additional bidirectional interface according to this disclosure.

FIG. 7 shows a schematic block diagram of a transceiver 700 according to the first aspect of the present disclosure and according to the CAN standard, which is for transmitting regular data to, and receiving regular data from, a CAN bus 711 via a first bidirectional interface 701 according to the CAN standard and for transmitting and receiving, in a serial manner, additional default data, or selectively additional function data, via an additional bidirectional interface 721 according to this disclosure.

The CAN transceiver 700 shown in FIG. 7 has a predetermined regular pinout, which comprises the input pin 702 (herein termed TXDC) and the output pin 706 (herein termed RXDC) to support the regular bidirectional communication with a corresponding microcontroller (not shown), and a predetermined additional pinout, which comprises the additional pin 720 (herein termed S) to support the additional bidirectional communication with the corresponding microcontroller (not shown). The input pin 702 couples communicatively to an input cell 704, and the output pin 706 couples communicatively to an output driver 708. The input cell 704 and the output driver 708 couple communicatively to a bus interface 710, which comprises a transmitter (including a driver) 712 that is coupled at one side to the input cell 704 and that couples at the other side to a first bus pin 716 (herein termed CANH) and to a second bus pin 718 (herein termed CANL), and a receiver 714 that is coupled at one side to the output driver 708 and that couples at the other side to the first bus pin 716 (CANH) and to the second bus pin 718 (CANL).

According to the first aspect of this disclosure, the additional pin 720 couples communicatively to an TO cell 722, the TO cell 722 couples communicatively to an input of a switch device 726, an additional default data handling circuitry 728 is embodied in a CAN transceiver as a mode control circuitry, is provided for handling additional default data (here: mode control data) and couples to a first output of the switch device 726, and an additional function data handling circuitry 730 is provided according to the teaching of this disclosure for handling additional function data and couples to a second output of the switch device 726.

Furthermore, an additional pin monitoring device 724 is provided according to the teaching of this disclosure and couples to the additional pin 720 for monitoring the traffic of additional data being transmitted over the additional pin 720 and for detecting an additional function communication start signal. The additional pin monitoring device 724 is configured to deactivate the default mode and to activate the additional function mode, when an additional function communication start signal is detected in the data traffic of additional default data received via the first additional pin 720. The additional pin monitoring device 724 is configured to generate a mode indication signal, which is indicates that the additional function mode is active, when an additional function communication start signal is detected in the data traffic of additional default data received via the first additional function pin 720, and which is indicates that the default mode is active, when the additional function mode is deactivated.

An output of the additional pin monitoring device 724 is used to output the mode indication signal to the switch device 724. The first switch device 726 is controllable by the mode indication signal as follows: The first switch device 726 communicatively couples its input to its first output and hence to the additional default data handling circuitry (here: mode control circuitry) 728, when the mode indication signal indicates that the default mode is active, and communicatively couples its input to its second output and hence to the additional function data handling circuitry 730, when the mode indication signal indicates that the additional function mode is active.

In other words, the implementation of the teaching of this disclosure in a CAN transceiver 700 can be described as follows. According to the teaching of this disclosure, an additional interconnection, which couples to the additional pin 720, is used for an additional communication exchange between the CAN transceiver and a corresponding microcontroller comprising a CAN controller (not shown). This is shown in FIG. 7 for a CAN transceiver, and could equally well be applied to a LIN transceiver as described below with reference to FIG. 8 or to a FlexRay transceiver as described further below with reference to FIG. 9.

In the CAN transceiver, the additional input pin 720 (herein termed S) is normally used to put the CAN transceiver in a silent mode. However, as per the teaching of this disclosure, an additional communication start pulse could equally well be applied on this pin 720, wherein the start pulse has characteristic properties which allow to detect it as a start pulse. The start pulse may have a predefined polarity, for example a raising leading edge and a falling trailing edge, or a falling leading edge and a raising trailing edge. The start pulse may further have a predefined pulse width, for example approximately 100 μs. Any one of the characteristic properties will be detected by the additional pin monitoring device 724, and interpreted as the start of the additional communication exchange. In addition, this pin 720 (S-pin) is then no longer used in its default mode, which would put the CAN transceiver 700 in the silent mode. In a next step, the transmission direction of this pin 720 (S-pin) is reconfigured from input to output, which is implemented by reconfiguring the IO cell 722 from an input cell to an output driver, and furthermore, the corresponding additional pin of the microcontroller (not shown, though compare to pin 270 in FIG. 2) is reconfigured from output to input. A first additional communication between the transceiver 700 and the microcontroller can now be effected in a first direction, viz. from the transceiver 700 to the microcontroller. It is noted that only for the time of this first additional communication, the regular function of the pin 720 (S-pin input) is not available. After that, the transmission direction of the pin 720 (S-pin) is reverted, which is implemented by reconfiguring the IO cell 722 from an output driver to an input cell, and the corresponding pin of the microcontroller is reverted again to output, as the default position. This pin transmission reverting may optionally be followed by a second additional communication, in the opposite direction to the first additional communication, from the microcontroller to the transceiver 700. Again, it is for the time of this additional communication in the opposite direction, that the regular function of the pin 720 (S-pin input) is not available. During the time of the (first and second) additional communication, the data on the corresponding interconnection shall not be interpreted as during the regular pin functioning. A summary of this scheme is shown in, and described with reference to, FIG. 12.

It is noted that the sequence of steps described hereinbefore, namely a first data transmission from the transceiver to the microcontroller followed by an optional second data transmission from the microcontroller to transceiver should be considered merely as an example embodiment. It will be easily understood that the sequence of steps could be reverted or extended, for example by having one or more data transmissions from the microcontroller to the transceiver, each directly followed by a reverse data transmission from the transceiver to the microcontroller. Such an extended sequence could for example even be used to implement registers with according addresses in the transceiver.

In addition, it is also easily possible to have a cyclic redundancy check (CRC) or a parity added to the data transmissions from and/or to the transceiver.

Finally, it is noted that the transceiver (as an embodiment of a first communication device) and the microcontroller (as an embodiment of a second communication counterpart device) are also only example embodiments, because this principle, i.e. the teaching of the additional communication of this disclosure, could easily be used in other systems and/or devices as well, for example in a system comprising a memory device (as an embodiment of a first communication device) and one of a microcontroller, a digital signal processor (DSP) and a processing device (as an embodiment of a second communication counterpart device).

Figure 8:
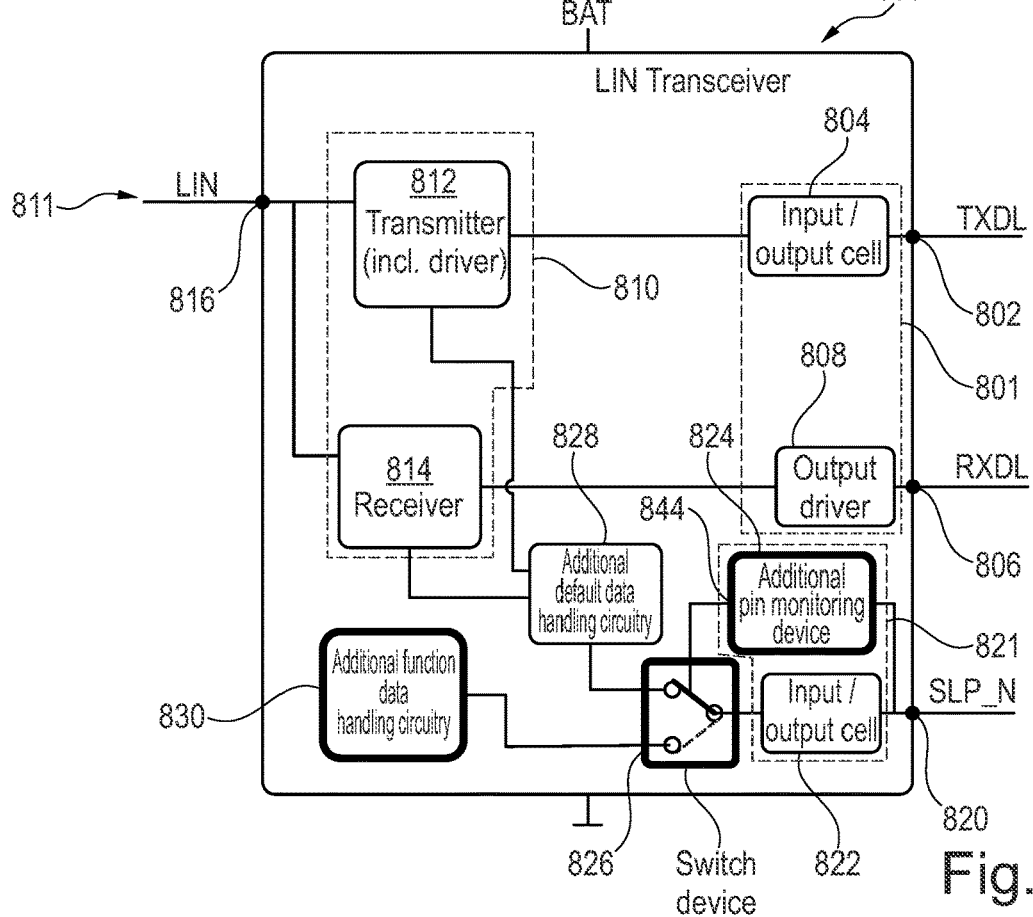
FIG. 8 shows a schematic block diagram of a transceiver according to the first aspect of the present disclosure and according to the LIN standard, which is for transmitting regular data to, and receiving regular data from, a LIN bus via a first bidirectional interface according to the LIN standard and for transmitting and receiving, in a serial manner, additional default data, or selectively additional function data, via an additional bidirectional interface according to this disclosure.

FIG. 8 shows a schematic block diagram of a transceiver 800 according to the first aspect of the present disclosure and according to the LIN standard, which is for transmitting regular data to, and receiving regular data from, a LIN bus 811 via a first bidirectional interface 801 according to the LIN standard and for transmitting and receiving, in a serial manner, additional default data, or selectively additional function data, via an additional bidirectional interface 821 according to this disclosure.

The LIN transceiver 800 shown in FIG. 8 has a predetermined regular pinout, which comprises the input pin 802 (herein termed TXDL) and the output pin 806 (herein termed RXDC) to support the regular bidirectional communication with a corresponding microcontroller (not shown), and a predetermined additional pinout, which comprises the additional pin 820 (herein termed SLP_N) to support the additional bidirectional communication with the corresponding microcontroller (not shown). The input pin 802 couples communicatively to an input/output cell 804, and the output pin 806 couples communicatively to an output driver 808. The input/output cell 804 and the output driver 808 couple communicatively to a bus interface 810, which comprises a transmitter (including a driver) 812 that is coupled at one side to the input cell 804 and that couples at the other side to the bus pin 816 (herein termed LIN), and a receiver 814 that is coupled at one side to the output driver 808 and that couples at the other side to the bus pin 816 (LIN).

The teaching of this disclosure, which has been described above and with reference to FIG. 7 for the CAN transceiver, can be applied to the LIN transceiver 800 as well, as is also shown in FIG. 8.

According to the first aspect of this disclosure, the additional pin 820 couples communicatively to an TO cell 822, the TO cell 822 couples communicatively to an input of a switch device 826, an additional default data handling circuitry 828 is embodied in a LIN transceiver as a mode control circuitry, is provided for handling additional default data (here: mode control data) and couples to a first output of the switch device 826, and an additional function data handling circuitry 830 is provided according to the teaching of this disclosure for handling additional function data and couples to a second output of the switch device 826.

Furthermore, an additional pin monitoring device 824 is provided according to the teaching of this disclosure and couples to the additional pin 820 for monitoring the traffic of additional data being transmitted over the additional pin 820 and for detecting an additional function communication start signal. The additional pin monitoring device 824 is configured to deactivate the default mode and to activate the additional function mode, when an additional function communication start signal is detected in the data traffic of additional default data received via the first additional pin 820. The additional pin monitoring device 824 is configured to generate a mode indication signal, which is indicates that the additional function mode is active, when an additional function communication start signal is detected in the data traffic of additional default data received via the first additional function pin 820, and which is indicates that the default mode is active, when the additional function mode is deactivated.

An output of the additional pin monitoring device 824 is used to output the mode indication signal to the switch device 824. The first switch device 826 is controllable by the mode indication signal as follows: The first switch device 826 communicatively couples its input to its first output and hence to the additional default data handling circuitry (here: mode control circuitry) 828, when the mode indication signal indicates that the default mode is active, and communicatively couples its input to its second output and hence to the additional function data handling circuitry 830, when the mode indication signal indicates that the additional function mode is active.

Figure 9:
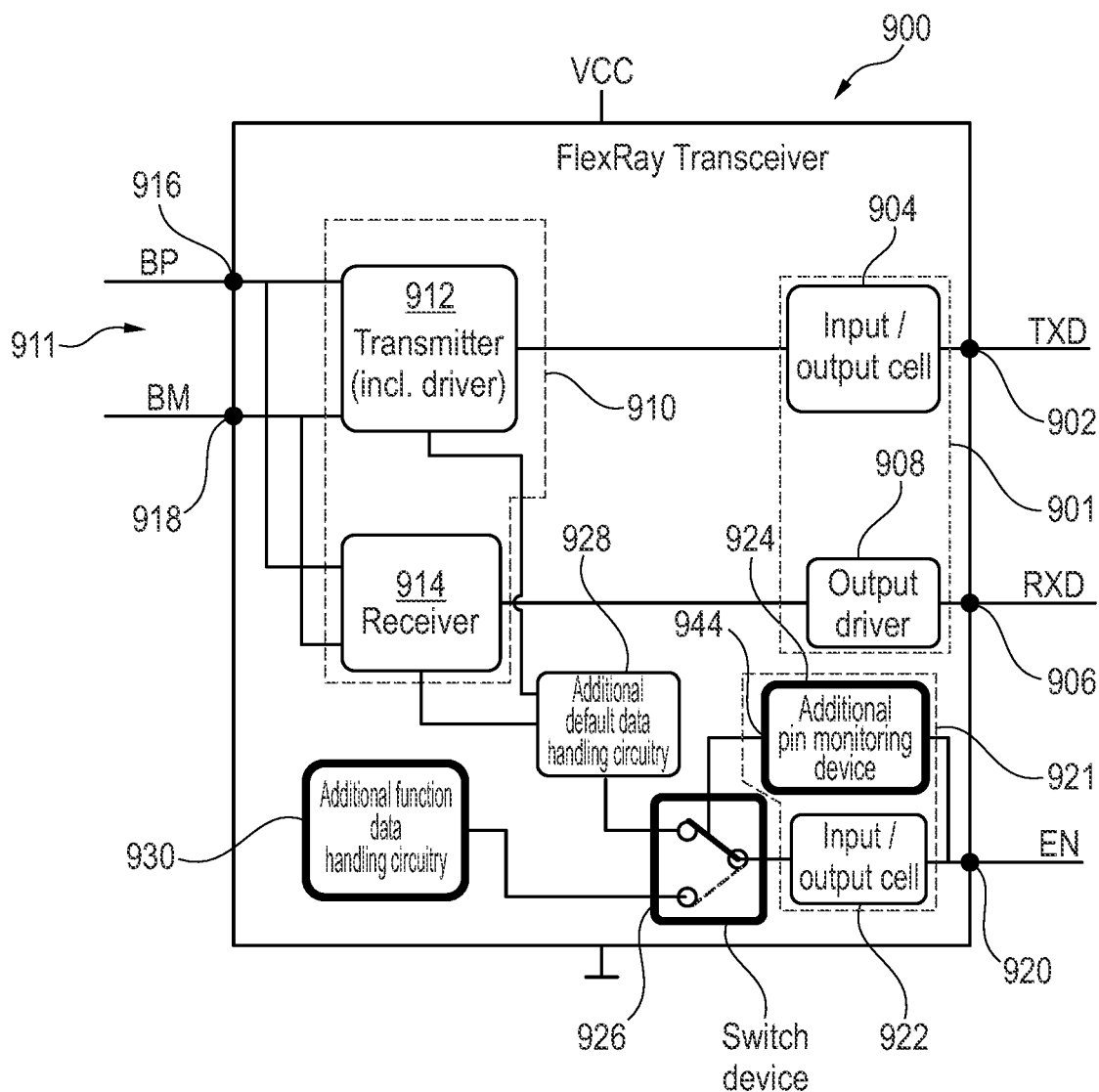
FIG. 9 shows a schematic block diagram of a transceiver according to the first aspect of the present disclosure and according to the FlexRay standard, which is for transmitting regular data to, and receiving regular data from, a FlexRay bus via a first bidirectional interface according to the FlexRay standard and for transmitting and receiving, in a serial manner, additional default data, or selectively additional function data, via an additional bidirectional interface according to this disclosure.

FIG. 9 shows a schematic block diagram of a transceiver 900 according to the first aspect of the present disclosure and according to the FlexRay standard, which is for transmitting regular data to, and receiving regular data from, a FlexRay bus 911 via a first bidirectional interface 901 according to the FlexRay standard and for transmitting and receiving, in a serial manner, additional default data, or selectively additional function data, via an additional bidirectional interface 921 according to this disclosure.

The FlexRay transceiver 900 shown in FIG. 9 has a predetermined regular pinout, which comprises the input pin 902 (herein termed TXD) and the output pin 906 (herein termed RXD) to support the regular bidirectional communication with a corresponding microcontroller (not shown), and a predetermined additional pinout, which comprises the additional pin 920 (herein termed EN) to support the additional bidirectional communication with the corresponding microcontroller (not shown). The input pin 902 couples communicatively to an input/output cell 904, and the output pin 906 couples communicatively to an output driver 908. The input/output cell 904 and the output driver 908 couple communicatively to a bus interface 910, which comprises a transmitter (including a driver) 912 that is coupled at one side to the input/output cell 904 and that couples at the other side to a first bus pin 916 (herein termed BP) and to a second bus pin 918 (herein termed BM), and a receiver 914 that is coupled at one side to the output driver 908 and that couples at the other side to the first bus pin 916 (BP) and to the second bus pin 918 (BM).

The teaching of this disclosure, which has been described above and with reference to FIG. 7 for the CAN transceiver and with reference to FIG. 8 for the LIN transceiver 800, can be applied to the FlexRay transceiver 900 as well, as is also shown in FIG. 9.

According to the first aspect of this disclosure, the additional pin 920 couples communicatively to an TO cell 922, the TO cell 922 couples communicatively to an input of a switch device 926, an additional default data handling circuitry 928 is embodied in a FlexRay transceiver as a mode control circuitry, is provided for handling additional default data (here: mode control data) and couples to a first output of the switch device 926, and an additional function data handling circuitry 930 is provided according to the teaching of this disclosure for handling additional function data and couples to a second output of the switch device 926.

Furthermore, an additional pin monitoring device 924 is provided according to the teaching of this disclosure and couples to the additional pin 920 for monitoring the traffic of additional data being transmitted over the additional pin 920 and for detecting an additional function communication start signal. The additional pin monitoring device 924 is configured to deactivate the default mode and to activate the additional function mode, when an additional function communication start signal is detected in the data traffic of additional default data received via the first additional pin 920. The additional pin monitoring device 924 is configured to generate a mode indication signal, which is indicates that the additional function mode is active, when an additional function communication start signal is detected in the data traffic of additional default data received via the first additional function pin 920, and which is indicates that the default mode is active, when the additional function mode is deactivated.

An output of the additional pin monitoring device 924 is used to output the mode indication signal to the switch device 924. The first switch device 926 is controllable by the mode indication signal as follows: The first switch device 926 communicatively couples its input to its first output and hence to the additional default data handling circuitry (here: mode control circuitry) 928, when the mode indication signal indicates that the default mode is active, and communicatively couples its input to its second output and hence to the additional function data handling circuitry 930, when the mode indication signal indicates that the additional function mode is active.

It is recalled that an additional bidirectional communication involving additional function data destined for the additional function data handling circuitry may be initiated either by a first communication device 200 to 600 (which may be embodied as one of the CAN-, LIN- and FlexRay-transceivers 700 to 900), or by a second communication counterpart device 250 and 450 to 650 (which may be embodied as a microcontroller (not shown) that is a counterpart to one of the CAN-, LIN- and FlexRay-transceivers 700 to 900). Furthermore, an additional bidirectional communication can be initiated with the first additional pin 220 to 620 or 720 to 920 of the first communication device being configured by default as an input pin and the corresponding additional pin 270 and 470 to 670 of the second communication counterpart device being configured by default as an output pin, or vice versa, with the first additional pin 220 to 620 or 720 to 920 of the first communication device being configured by default as an output pin and the corresponding additional pin 270 and 470 to 670 of the second communication counterpart device being configured by default as an input pin.

In summary, an additional bidirectional communication involving additional function data destined for the additional function data handling circuitry may be initiated according to one of the schemes A) to D) as follows.

Scheme A): The additional bidirectional communication is initiated by the first communication device 200 to 600, on the basis of its first additional pin 220 to 620 being by default an output pin.

Scheme B): The additional bidirectional communication is initiated by the first communication device 200 to 600, on the basis of its first additional pin 220 to 620 being by default an input pin.

Scheme C): The additional bidirectional communication is initiated by the second communication counterpart device 250 and 450 to 650, on the basis of its additional pin 270 and 470 to 670 being by default an input pin.

Scheme D): The additional bidirectional communication is initiated by the second communication counterpart device 250 and 450 to 650, on the basis of its additional pin 270 and 470 to 670 being by default an output pin.

Descriptions of embodiments of the courses of the additional communications, or embodiments of the sequences of steps to be performed, are described in the following, for scheme A) with reference to FIG. 10, for scheme B) with reference to FIG. 11, for scheme C) with reference to FIG. 12, and for scheme D) with reference to FIG. 13.

Figure 10:
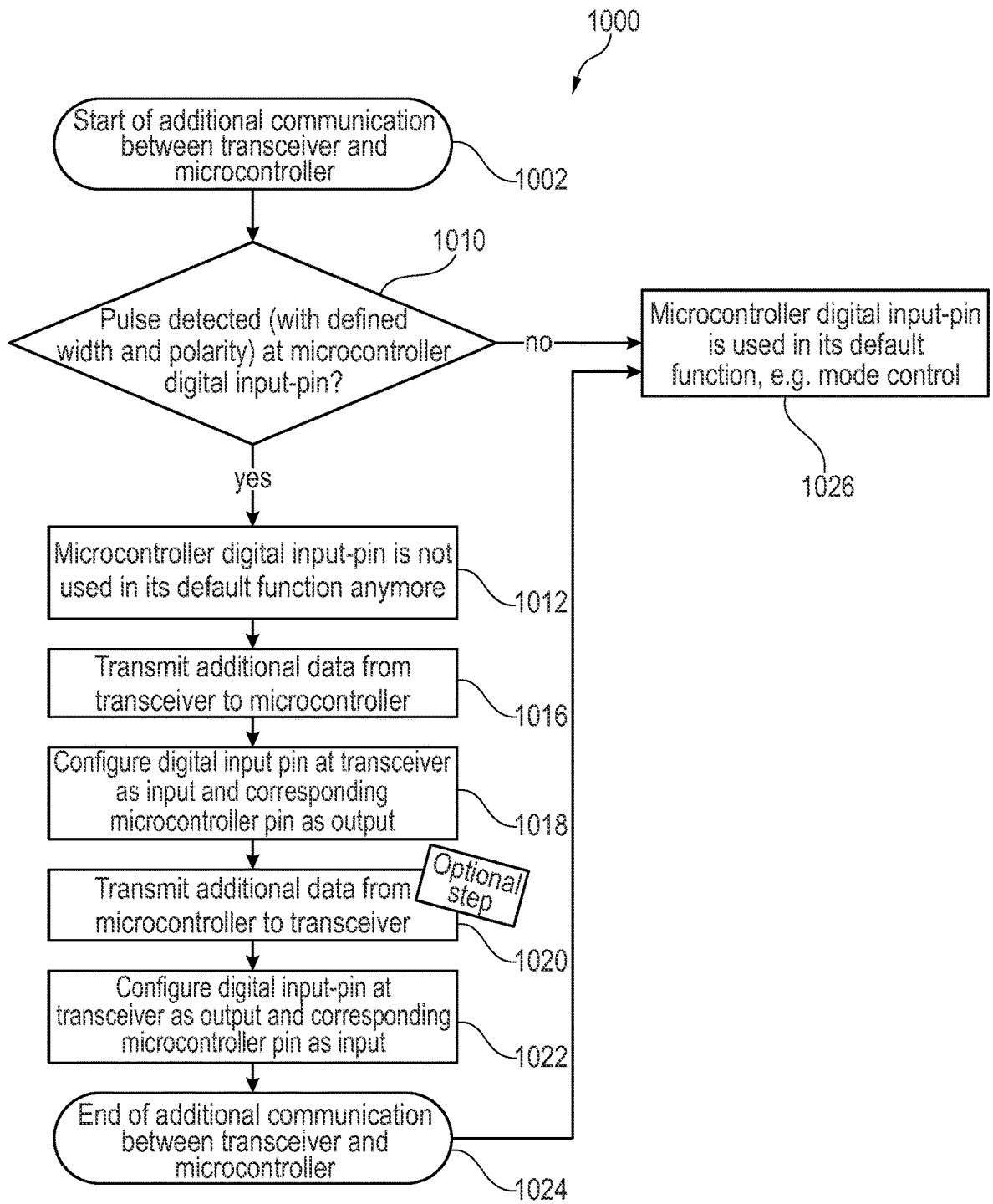
FIG. 10 shows a flow diagram of a first embodiment of a method for transmitting and receiving additional data between a transceiver as a first communication device and a corresponding microcontroller as a second communication counterpart device via an additional bidirectional interface, wherein the transceiver initiates a communication involving additional functional data in a case, wherein, by default, the first additional pin of the transceiver is an output pin and the first additional pin of the microcontroller is an input pin.

FIG. 10 shows a flow diagram of a first embodiment of a method 1000 for transmitting and receiving additional data between a transceiver 700, 800, 900 as a first communication device and a corresponding microcontroller as a second communication counterpart device via an additional bidirectional interface 721, 821, 921, wherein the transceiver 700, 800, 900 initiates a communication involving additional functional data in a case, wherein, by default, the first additional pin 720, 820, 920 of the transceiver 700, 800, 900 is an output pin and the first additional pin of the corresponding microcontroller is an input pin.

The method 1000 starts at step 1002 by starting an additional communication between the transceiver and the microcontroller. The method continues to step 1010, where it is checked whether an additional communication start pulse (e.g. with defined width and polarity) is detected by the additional pin monitoring device of the microcontroller at the digital additional pin of the microcontroller. If the result of the check at step 1010 is negative (no start pulse is detected), the method continues to step 1026, where the digital additional pin of the microcontroller is continued to be used in its default function as transmitting additional default data (e.g. mode control and/or status information).

If the result of the check at step 1010 is positive (a start pulse is detected), the method continues to step 1012, where the digital additional pin of the microcontroller is not used any longer in its default function, but is now used in an additional communication function as transmitting additional function data. The method continues to step 1016, where additional function data are transmitted from the transceiver 700, 800, 900 to the corresponding microcontroller. The method continues further to step 1018, where the digital additional pin 720, 820, 920 at the transceiver is reconfigured as an input pin and the corresponding additional pin at the microcontroller is reconfigured as an output pin. The method continues further to the optional step 1020, where additional function data are transmitted from the microcontroller to the transceiver 700, 800, 900. The method then continues to the step 1022, where the digital additional pin 720, 820, 920 at the transceiver is reconfigured as an output pin and the corresponding additional pin at the microcontroller is reconfigured as an input pin.

Following the step 1022, the method continues to the step 1024, where the additional communication between the transceiver and the microcontroller is ended. Then, the method continues to the step 1026, where the digital additional pin of the microcontroller is reconfigured to be used in its default function as transmitting additional default data (e.g. mode control and/or status information).

It is noted that in the step 1012, in the example of a CAN transceiver 700, the additional pin 720 is the S-pin; in the example of a LIN transceiver 800, the additional pin 820 is the SLP_N-pin, and in the example of a FlexRay transceiver 900, the additional pin 920 is the EN-pin. In the step 1022, the transceiver 700, 800, 900 configures its additional pin 720, 820, 920 later (for example as output-high) in order to avoid that the two additional pins (both of the transceiver and the microcontroller) are configured/activated at the same time. In the step 1018, the microcontroller configures its additional pin later (for example as output-high) in order to avoid that the two additional pins (both of the microcontroller and the transceiver) are configured/activated at the same time.

More generally, for the system comprising the first and second communication device 200, 300, and in the language of the appended patent claims, the method 1000 of the additional communication according to the scheme A) may be described as comprising the following steps:

- in the default mode, configuring the I/O cell 222 as an output driver for transmitting default data from first additional default data handling circuitry 228 via the I/O cell 222 and the first additional pin 220 to the second communication counterpart device 250;
- by the first communication device 200, initiating 1102 an additional communication for the additional function data handling circuitry 230 and transmitting an additional function communication start signal via the first additional pin 270 to the second communication counterpart device 250;
- by said additional pin monitoring device 274, detecting the additional function communication start signal, deactivating the default mode and activating the additional function mode;
- communicatively coupling the additional function data handling circuitry 280 to the I/O cell 272; and
- by the additional function data handling circuitry 230, transmitting 1116 first additional function data via the I/O cell 222 to the second communication counterpart device 250.

In one or more embodiments, the method further includes either or both of the following further steps:

- after transmitting 1116 the first additional function data from the additional function data handling circuitry 230 to the second communication counterpart device (250), reconfiguring 1118 the I/O cell 222 as an input cell, by the additional function data handling circuitry 230, receiving second additional function data via the I/O cell 222 from the second communication counterpart device 250, and reconfiguring 1122 the I/O cell 222 as an output driver, and
- deactivating the additional function mode and activating 1126 the default mode.

Figure 11:
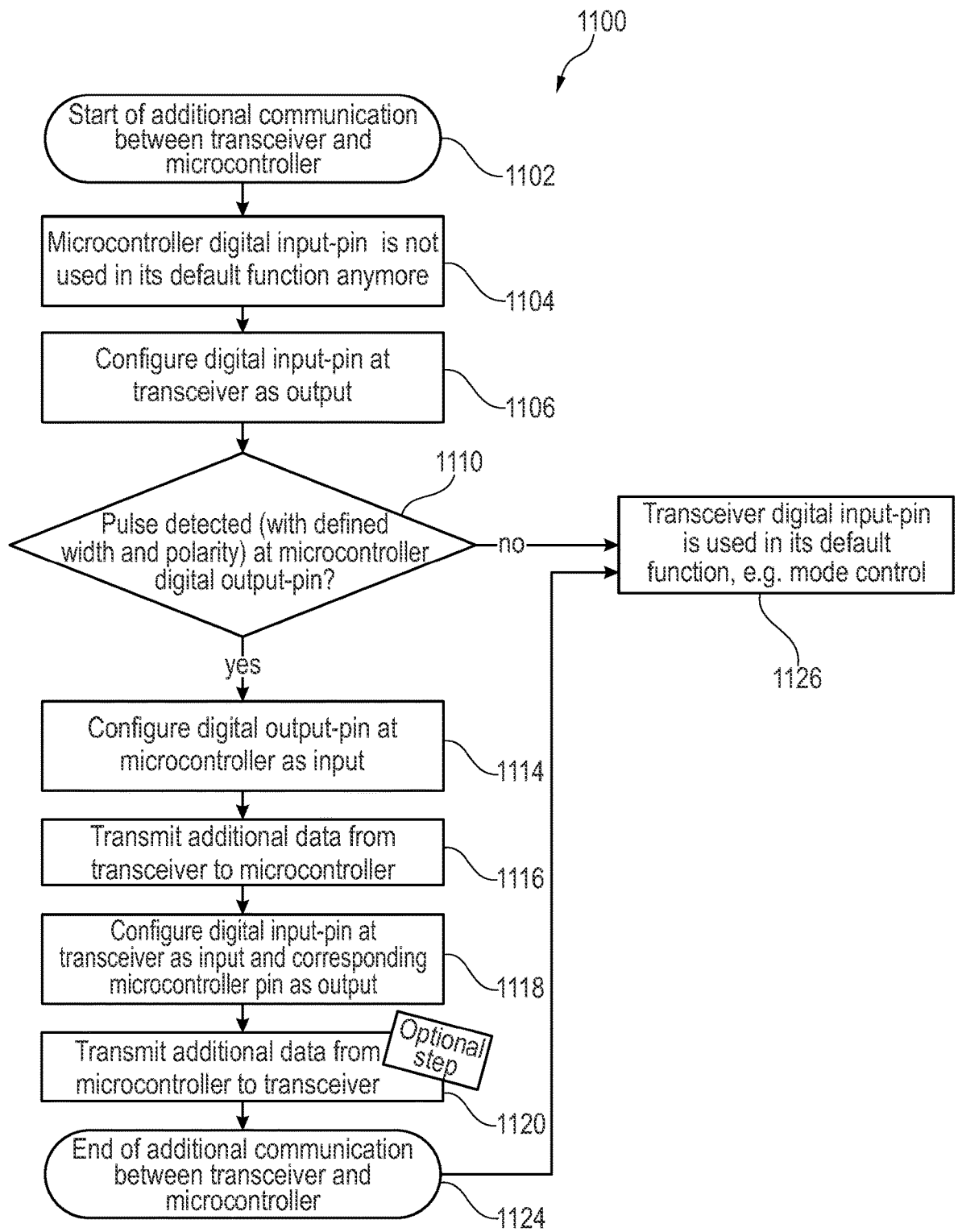
FIG. 11 shows a flow diagram of a second embodiment of a method for transmitting and receiving additional data between a transceiver as a first communication device and a corresponding microcontroller as a second communication counterpart device via an additional bidirectional interface, wherein the transceiver initiates a communication involving additional functional data in a case, wherein, by default, the first additional pin of the transceiver is an input pin and the first additional pin of the microcontroller is an output pin.

FIG. 11 shows a flow diagram of a second embodiment of a method 1100 for transmitting and receiving additional data between a transceiver 700, 800, 900 as a first communication device and a corresponding microcontroller as a second communication counterpart device via an additional bidirectional interface 721, 821, 921, wherein the transceiver 700, 800, 900 initiates a communication involving additional functional data in a case, wherein, by default, the first additional pin 720, 820, 920 of the transceiver 700, 800, 900 is an input pin and the first additional pin of the corresponding microcontroller is an output pin.

The method 1100 starts at step 1102 by starting an additional communication between the transceiver and the microcontroller. The method continues to step 1104, where the digital additional pin 720, 820, 920 is not used any longer in its default function, but is now used in an additional communication function as transmitting additional function data. The method continues further to step 1106, where the digital additional pin 720, 820, 920 at the transceiver is reconfigured as an output pin and the corresponding additional pin at the microcontroller is reconfigured as an input pin. The method continues to step 1110, where it is checked whether an additional communication start pulse (e.g. with defined width and polarity) is detected by the additional pin monitoring device of the microcontroller at the digital additional pin of the microcontroller. If the result of the check at step 1110 is negative (no start pulse is detected), the method continues to step 1126, where the digital additional pin 720, 820, 920 of the transceiver is reconfigured to be used in its default function as transmitting additional default data (e.g. mode control and/or status information).

If the result of the check at step 1110 is positive (a start pulse is detected), the method continues to step 1114, where the digital additional pin at the microcontroller is reconfigured as an input pin and the corresponding additional pin 720, 820, 920 at the transceiver 700, 800, 900 is reconfigured as an output pin. The method continues to step 1116, where additional function data are transmitted from the transceiver 700, 800, 900 to the corresponding microcontroller. The method continues further to step 1118, where the digital additional pin 720, 820, 920 at the transceiver is reconfigured as an input pin and the corresponding additional pin at the microcontroller is reconfigured as an output pin. The method continues further to the optional step 1120, where additional function data are transmitted from the microcontroller to the transceiver 700, 800, 900.

Following the step 1120, the method continues to the step 1124, where the additional communication between the transceiver and the microcontroller is ended. Then, the method continues to the step 1126, where the digital additional pin 720, 820, 920 of the transceiver 700, 800, 900 is reconfigured to be used in its default function as transmitting additional default data (e.g. mode control and/or status information).

It is noted that in the steps 1106 and 1118, in the example of a CAN transceiver 700, the additional pin 720 is the S-pin; in the example of a LIN transceiver 800, the additional pin 820 is the SLP_N-pin, and in the example of a FlexRay transceiver 900, the additional pin 920 is the EN-pin. In the step 1106, the transceiver 700, 800, 900 configures its additional pin 720, 820, 920 later (for example as output-high) in order to avoid that the two additional pins (both of the transceiver and the microcontroller) are configured/activated at the same time. In the step 1118, the microcontroller configures its additional pin later (for example as output-high) in order to avoid that the two additional pins (both of the microcontroller and the transceiver) are configured/activated at the same time.

More generally, for the system comprising the first and second communication device 200, 300, and in the language of the appended patent claims, the method 1100 of the additional communication according to the scheme B) may be described as comprising the following steps:

- in the default mode, configuring 1106 the I/O cell 222 as an input cell for transmitting default data from the second communication counterpart device 250 via the first additional pin 220 and the I/O cell 222 to the first additional default data handling circuitry 228,
- by the first communication device 200, initiating 1102 an additional communication for the additional function data handling circuitry 230 and transmitting an additional function communication start signal via the first additional pin 220 to the second communication counterpart device 250, by said additional pin monitoring device 274, detecting 1110, yes, the additional function communication start signal, deactivating the default mode and activating the additional function mode, configuring the I/O cell 272 as an input driver and the I/O cell 222 as an output driver, communicatively coupling the additional function data handling circuitry 230 to the I/O cell 222, and by the additional function data handling circuitry 230, transmitting 1116 first additional function data via the I/O cell 222 to the second communication counterpart device 250.

In one or more embodiments, the method further includes either or both of the following further steps:

after transmitting 1116 the first additional function data from the additional function data handling circuitry 230 to the second communication counterpart device 250, reconfiguring 1118 the I/O cell 222 as an input cell and the I/O cell 272 as an output cell, by the additional function data handling circuitry 230, receiving 1120 second additional function data via the I/O cell 222 from the second communication counterpart device 250, and deactivating the additional function mode and activating 1226 the default mode.

Figure 12:
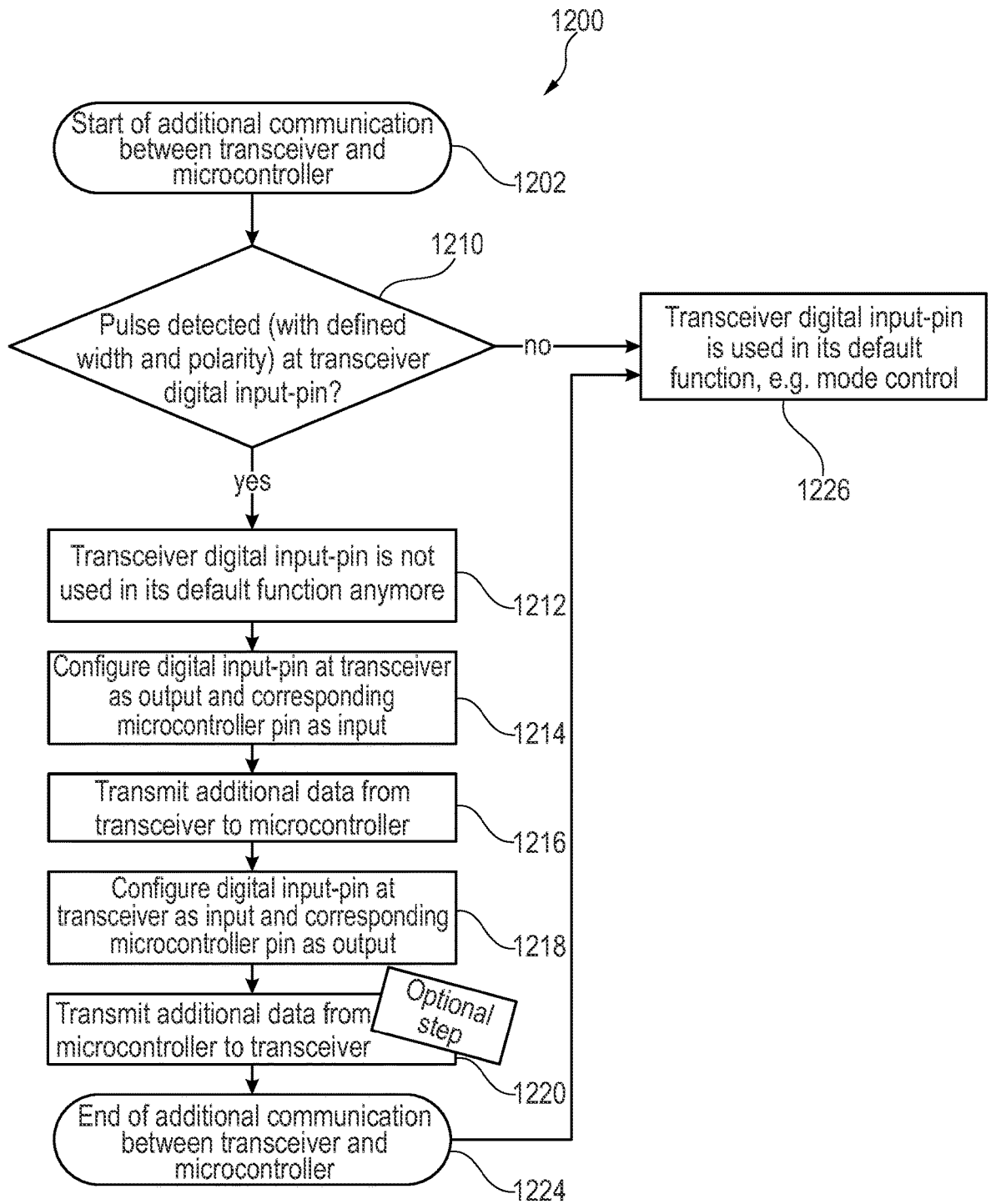
FIG. 12 shows a flow diagram of a third embodiment of a method for transmitting and receiving additional data between a transceiver as a first communication device and a corresponding microcontroller as a second communication counterpart device via an additional bidirectional interface, wherein the microcontroller initiates a communication involving additional functional data in a case, wherein, by default, the first additional pin of the transceiver is an input pin and the first additional pin of the microcontroller is an output pin.

FIG. 12 shows a flow diagram 1200 of a third embodiment of a method for transmitting and receiving additional data between a transceiver 700, 800, 900 as a first communication device and a corresponding microcontroller as a second communication counterpart device via an additional bidirectional interface 721, 821, 921, wherein the microcontroller initiates a communication involving additional functional data in a case, wherein, by default, the first additional pin 720, 820, 920 of the transceiver 700, 800, 900 is an input pin and the first additional pin of the corresponding microcontroller is an output pin.

The method 1200 starts at step 1202 by starting an additional communication between the transceiver and the microcontroller. The method continues to step 1210, where it is checked whether an additional communication start pulse (e.g. with defined width and polarity) is detected by the additional pin monitoring device 724, 824, 924 of the transceiver 700, 800, 900 at the digital additional pin 720, 820, 920 of the transceiver. If the result of the check at step 1210 is negative (no start pulse is detected), the method continues to step 1226, where the digital additional pin 720, 820, 920 of the transceiver 700, 800, 900 is continued to be used in its default function as transmitting additional default data (e.g. mode control and/or status information).

If the result of the check at step 1210 is positive (a start pulse is detected), the method continues to step 1212, where the digital additional pin 720, 820, 920 of the transceiver 700, 800, 900 is not used any longer in its default function, but is now used in an additional communication function as transmitting additional function data. The method continues to step 1214, where the digital additional pin 720, 820, 920 at the transceiver is reconfigured as an output pin and the corresponding additional pin at the microcontroller is reconfigured as an input pin. The method continues further to step 1216, where additional function data are transmitted from the transceiver 700, 800, 900 to the corresponding microcontroller.

The method continues further to step 1218, where the digital additional pin 720, 820, 920 at the transceiver is reconfigured as an input pin and the corresponding additional pin at the microcontroller is reconfigured as an output pin. The method continues further to the optional step 1220, where additional function data are transmitted from the microcontroller to the transceiver 700, 800, 900.

Following the step 1220, the method continues to the step 1224, where the additional communication between the transceiver and the microcontroller is ended. Then, the method continues to the step 1126, where the digital additional pin 720, 820, 920 of the transceiver 700, 800, 900 is reconfigured to be used in its default function as transmitting additional default data (e.g. mode control and/or status information).

It is noted that in the steps 1212, 1214 and 1218, in the example of a CAN transceiver 700, the additional pin 720 is the S-pin; in the example of a LIN transceiver 800, the additional pin 820 is the SLP_N-pin, and in the example of a FlexRay transceiver 900, the additional pin 920 is the EN-pin. In the step 1214, the transceiver 700, 800, 900 configures its additional pin 720, 820, 920 later (for example as output-high) in order to avoid that the two additional pins (both of the transceiver and the microcontroller) are configured/activated as an output at the same time. In the step 1218, the microcontroller configures its additional pin later (for example as output-high) in order to avoid that the two additional pins (both of the microcontroller and the transceiver) are configured/activated at the same time.

More generally, for the system comprising the first and second communication device 200, 300, and in the language of the appended patent claims, the method 1200 of the additional communication according to the scheme C) may be described as comprising the following steps:

in the default mode, configuring the I/O cell 222 as an input cell for transmitting default data from the second communication counterpart device 250 via the first additional pin 220 and the I/O cell 222 to the first additional default data handling circuitry 228;

by the second communication counterpart device 250, initiating 1202 an additional function communication for the additional function data handling circuitry 228 and transmitting an additional function communication start signal via the first additional pin 220 to the first communication device 200;

by the additional pin monitoring device 224, detecting 1210, yes, the additional function communication start signal, deactivating the default mode and activating 1212 the additional function mode;

reconfiguring 1214 the I/O cell 222 as an output driver and the I/O cell 272 as an input driver;

communicatively coupling the additional function data handling circuitry 230 to the I/O cell 222; and by the additional function data handling circuitry 230, transmitting 1216 first additional function data via the I/O cell 222 to the second communication counterpart device 250.

In one or more embodiments, the method further includes either or both of the following further steps:

after transmitting 1216 the first additional function data from the additional function data handling circuitry 230 to the second communication counterpart device 250, reconfiguring 1218 the I/O cell 222 as an input cell and the I/O cell 272 as an output cell and, by the additional function data handling circuitry, receiving 1220 second additional function data via the I/O cell 222 from the second communication counterpart device 200; and deactivating the additional function mode and activating 1026 the default mode.

Figure 13:
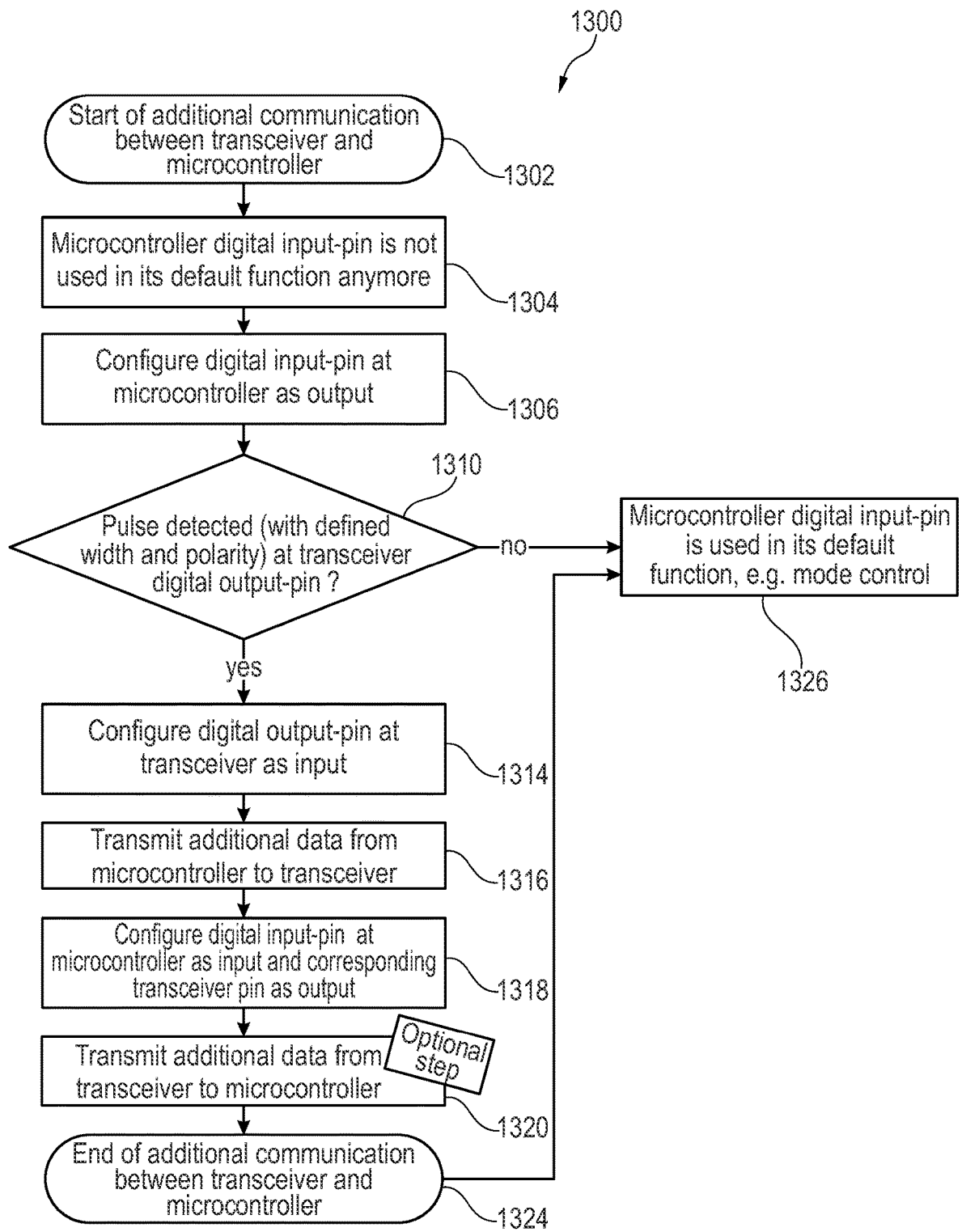
FIG. 13 shows a flow diagram of a fourth embodiment of a method for transmitting and receiving additional data between a transceiver as a first communication device and a corresponding microcontroller as a second communication counterpart device via an additional bidirectional interface, wherein the microcontroller initiates a communication involving additional functional data in a case, wherein, by default, the first additional pin of the transceiver is an output pin and the first additional pin of the microcontroller is an input pin.

FIG. 13 shows a flow diagram of a fourth embodiment of a method 1300 for transmitting and receiving additional data between a transceiver 700, 800, 900 as a first communication device and a corresponding microcontroller as a second communication counterpart device via an additional bidirectional interface 721, 821, 921, wherein the microcontroller initiates a communication involving additional functional data in a case, wherein, by default, the first additional pin 720, 820, 920 of the transceiver 700, 800, 900 is an output pin and the first additional pin of the corresponding microcontroller is an input pin.

The method 1300 starts at step 1302 by starting an additional communication between the transceiver and the microcontroller. The method continues to step 1304, where the digital additional pin of the microcontroller is not used any longer in its default function as transmitting additional default data (e.g. mode control and/or status information data), but is now used in an additional communication function as transmitting additional function data. The method continues further to step 1306, where the digital additional pin at the microcontroller is reconfigured as an output pin and the corresponding additional pin 720, 820, 920 at the transceiver is reconfigured as an input pin. The method continues to step 1310, where it is checked whether an additional communication start pulse (e.g. with defined width and polarity) is detected by the additional pin monitoring device 724, 824, 924 of the transceiver 700, 800, 900 at the digital additional pin 720, 820, 920 of the transceiver. If the result of the check at step 1310 is negative (no start pulse is detected), the method continues to step 1326, where the digital additional pin of the microcontroller is reconfigured to be used in its default function as transmitting additional default data (e.g., mode control and/or status information).

If the result of the check at step 1310 is positive (a start pulse is detected), the method continues to step 1314, where the digital additional pin 720, 820, 920 at the transceiver 700, 800, 900 is reconfigured as an input pin and the corresponding additional pin at the microcontroller is reconfigured as an output pin. The method continues to step 1316, where additional function data are transmitted from the microcontroller to the transceiver 700, 800, 900. The method continues further to step 1318, where the digital additional pin at the microcontroller is reconfigured as an input pin and the corresponding additional pin 720, 820, 920 at the transceiver 700, 800, 900 is reconfigured as an output pin. The method continues further to the optional step 1320, where additional function data are transmitted from the transceiver 700, 800, 900 to the microcontroller.

Following the step 1320, the method continues to the step 1324, where the additional communication between the transceiver and the microcontroller is ended. Then, the method continues to the step 1326, where the digital additional pin of the microcontroller is reconfigured to be used in its default function as transmitting additional default data (e.g. mode control and/or status information).

It is noted that in the steps 1304 and 1306, in the example of a CAN transceiver 700, the additional pin 720 is the S-pin; in the example of a LIN transceiver 800, the additional pin 820 is the SLP_N-pin, and in the example of a FlexRay transceiver 900, the additional pin 920 is the EN-pin. In the step 1314, the transceiver 700, 800, 900 configures its additional pin 720, 820, 920 later (for example as output-high) in order to avoid that the two additional pins (both of the transceiver and the microcontroller) are configured/activated at the same time. In the step 1318, the microcontroller configures its additional pin later (for example as output-high) in order to avoid that the two additional pins (both of the microcontroller and the transceiver) are configured/activated at the same time.

More generally, for the system comprising the first and second communication device 200, 300, and in the language of the appended patent claims, the method 1300 of the additional communication according to the scheme D) may be described as comprising the following steps:

in the default mode, I got your configuring the I/O cell 222 as an output driver for transmitting default data from the first additional default data handling circuitry 228 via the I/O cell 222 and the first additional pin 220 to the second communication counterpart device 250;

by the second communication counterpart device 250, initiating 1302 an additional communication for the additional function data handling circuitry 230;

reconfiguring 1306 the I/O cell 272 as an output cell;

transmitting an additional function communication start signal via the first additional pin 220 to the first communication device 200;

by said additional pin monitoring device 224, detecting 1310, yes, the additional function communication start signal, deactivating the default mode and activating the additional function mode;

reconfiguring 1314 the I/O cell 222 as an input cell;

communicatively coupling the additional function data handling circuitry 230 to the I/O cell 222; and by the second communication counterpart device 250, transmitting 1316 first additional function data via the I/O cell 222 to the additional function data handling circuitry 230.

In one or more embodiments, the method further includes either or both of the following further steps:

after transmitting 1316 the first additional function data from the second communication counterpart device 250 to the additional function data handling circuitry 230, reconfiguring 1318 the I/O cell 272 as an input cell and the I/O cell 222 as an output driver, and by the additional function data handling circuitry 230, transmitting 1320 second additional function data via the I/O cell 222 to the second communication counterpart device 250, and deactivating the additional function mode and activating 1326 the default mode.

In operation of the first communication device 200, 300, after the additional function communication start signal has been detected and while the I/O cell 222, 322 is being used for transmitting additional function data, the first additional pin 220, 320 cannot be used in its default mode function for receiving and sending default data. Moreover, after the additional function communication start signal has been detected and while the I/O cell 222, 322 is being used for transmitting additional function data, in a first communication device 200, 300, 700, 800, 900 being embodied as a transceiver, the regular bidirectional interface 201, 301 can, without interruption, be used in a respective standard mode function for sending and receiving bus data according to the respective bus standard, which is one of the CAN bus standard, the LIN bus standard, and the FlexRay standard.

After having sent first additional function data via the I/O cell 222, 322 and the first additional pin 220, 320 and when second additional function data are not to be sent in response to having sent the first additional function data, the first additional pin 220, 320 is reconfigurable to be used in its default mode function for transmitting default data. After having sent first additional function data via the I/O cell 222, 322 and the first additional pin 220, 320 in a first direction and after having sent second additional function data via the I/O cell 222, 322 and the first additional pin 220, 320 in a second direction opposite to the first direction, the first additional pin 220, 320 is reconfigurable to be used in its default mode function for transmitting default data.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Supplementary, it is to be noted that "having" or "comprising" does not exclude other elements or steps, and that "a" or "an" does not exclude a plurality. In addition, it is to be noted that features or steps, which have been described above with reference to one of the above embodiment examples, may also be used in combination with other features or steps of other embodiment examples that have been described above. Reference numerals in the claims are not to be construed as limitations.

What is claimed is:

1. A communication device for transmitting and receiving regular data via a first predetermined regular bidirectional interface, respectively, to and from a second communication counterpart device, and for transmitting and receiving additional data via a first predetermined additional bidirectional interface, respectively, to and from the second communication counterpart device, wherein the communication device has:
    a predetermined pinout comprising a predetermined regular pinout, which corresponds to the predetermined regular bidirectional interface configured to support regular bidirectional communication of regular data with the second communication counterpart device, and a predetermined additional pinout, which corresponds to the predetermined additional bidirectional interface configured to support additional bidirectional communication of additional data with the second communication counterpart device;
    wherein the additional pinout comprises at least a first additional pin, wherein the corresponding additional bidirectional interface comprises a first input/output, I/O, cell, which has a first input that is communicatively coupled to the first additional pin and a first output, and which is configurable to operate either as a first additional output driver or as a first additional input cell;
    wherein the communication device has a first additional default data handling circuitry, which is communicatively coupled to the first output of the first I/O cell, and which is configured to transmit and receive additional default data via the additional bidirectional interface, when a default mode is active;
    wherein the communication device further has a first additional function data handling circuitry, which is communicatively coupled to the first output of the first I/O cell, and which is configured to transmit and receive additional function data via the additional bidirectional interface, when an additional function mode is active; and
    wherein the communication device further has an additional pin monitoring device, which is communicatively coupled to the first additional pin, and which is configured to monitor data traffic via the first additional pin and to detect an additional function communication start signal present in the data traffic of additional default data received via the first additional pin, and which is further configured to deactivate the default mode and to activate the additional function mode, when an additional function communication start signal is detected in the data traffic of additional default data received via the first additional pin.

2. The communication device of claim 1, wherein the additional pin monitoring device is configured to generate a mode indication signal, which is configured to indicate that the additional function mode is active, when an additional function communication start signal is detected in the data traffic of additional default data received via the first additional function pin, and which is configured to indicate that the default mode is active, when the additional function mode is deactivated, and
    wherein the communication device further has a first switch device, which comprises an input, which is communicatively coupled to the first output of the first I/O cell, a first output, which is communicatively coupled to the first additional default data handling circuitry, and a second output, which is communicatively coupled to the first additional function data handling circuitry,
    wherein the first switch device is configured to be controllable by the mode indication signal, wherein the first switch device communicatively couples its input to its first output, when the mode indication signal indicates that the default mode is active, and communicatively couples its input to its second output, when the mode indication signal indicates that the additional function mode is active.

3. The communication device of claim 2, further having a start signal generation circuitry, which has a first output, and which is capable to generate an additional function communication start signal and to output a generated additional function communication start signal via its first output, wherein the first output is communicatively coupled to the second output of the switch device, so that the communication device is capable to transmit an additional function communication start signal through the first I/O cell and via the first additional pin, when the first switch device is controlled to couple its input to its second output.

4. The communication device of claim 2,
    wherein the additional pinout has at least one further additional pin, for example a plurality of further additional pins;
    wherein the corresponding additional bidirectional interface further comprises at least one further I/O cell, for example a plurality of further I/O cells, each of which has a further input and a further output and is configurable to operate either as a further additional output driver or as a further additional input cell, wherein each one of the further inputs of the further I/O cells is communicatively coupled to a corresponding one of the further additional pins;
    wherein the communication device has at least one further additional default data handling circuitry, for example a plurality of further additional default data handling circuitries, each of which is communicatively coupled to a corresponding one of the further outputs of the further I/O cells and configured to transmit and receive additional default data via the additional bidirectional interface, when the default mode is active; and
    wherein the communication device further has at least one further additional function data handling circuitry, for example a plurality of further additional function data handling circuitries, each of which is communicatively coupled to a corresponding one of the further outputs of the further I/O cells and configured to transmit and receive additional function data via the additional bidirectional interface, when the additional function mode is active.

5. The communication device of claim 4, further comprising:
a plurality of one or more further switch devices, each of which comprises an input, which is communicatively coupled to the further output of a corresponding further I/O cell, a first output, which is communicatively coupled to the corresponding further additional default data handling circuitry, and a second output, which is communicatively coupled to the corresponding further additional function data handling circuitry;
wherein each one of the plurality of further switch devices is configured to be controllable by the mode indication signal, wherein each one of the further switch devices communicatively couples its input to its first output, when the mode indication signal indicates that the default mode is active, and communicatively couples its input to its second output, when the mode indication signal indicates that the additional function mode is active.

6. The communication device of claim 1, wherein the additional pin monitoring device is communicatively coupled to each one of the further additional pins and is configured to:
monitor data traffic via each one of the further additional pins;
detect an additional function communication start signal or at least a portion of an additional function communication start signal present in the data traffic of additional default data received via a respective one of the further additional pins; and
deactivate the default mode and to activate the additional function mode, when an additional function communication start signal or at least a portion of an additional function communication start signal is detected in the data traffic of additional default data received via any one of the further additional pins, or when at least a first portion of an additional function communication start signal is detected in the data traffic of additional default data received via a first one of the further additional pins and at least a second portion of an additional function communication start signal is detected in the data traffic of additional default data received via a second one of the further additional pins.

7. The communication device of claim 1, wherein the communication device is configured to initiate an additional bidirectional communication involving additional function data for the additional function data handling circuitry with the second communication counterpart device.

8. The communication device of claim 7,
wherein, after initiation of the additional bidirectional communication by the communication device, the I/O cell is configurable as an output driver, and the additional function data handling circuitry is configurable to transmit first additional function data via the I/O cell to the second communication counterpart device; and
wherein after transmitting the first additional function data from the additional function data handling circuitry to the second communication counterpart device, the I/O cell is reconfigurable as an input cell, and the additional function data handling circuitry is reconfigurable to receive second additional function data via the I/O cell from the second communication counterpart device.

9. The communication device of claim 7,
wherein, after initiation of the additional bidirectional communication by the communication device, the I/O cell is configurable as an input cell, and the additional function data handling circuitry is configurable to receive first additional function data via the I/O cell from the second communication counterpart device; and
wherein, after receiving the first additional function data by the additional function data handling circuitry from the second communication counterpart device, the I/O cell is reconfigurable as an input cell, and the additional function data handling circuitry is reconfigurable to transmit second additional function data via the I/O cell to the second communication counterpart device.

10. The communication device of claim 1, wherein the second communication counterpart device is configured to initiate an additional bidirectional communication involving additional function data, and wherein the communication device is configured to handle the additional bidirectional communication for the additional function data handling circuitry with the second communication counterpart device.

11. The communication device of claim 10,
wherein, after initiation of the additional bidirectional communication by the second communication counterpart device, the I/O cell is configurable as an input cell, and the additional function data handling circuitry is configurable to receive first additional function data via the I/O cell from the second communication counterpart device; and
wherein, after receiving the first additional function data from the second communication counterpart device by the additional function data handling circuitry, the I/O cell is reconfigurable as an output driver, and the additional function data handling circuitry is configurable to transmit second additional function data via the I/O cell to the second communication counterpart device.

12. The communication device of claim 10,
wherein, after initiation of the additional bidirectional communication by the second communication counterpart device, the I/O cell is configurable as an output driver, and the additional function data handling circuitry is configurable to transmit first additional function data via the I/O cell to the first communication counterpart device; and
wherein, after transmitting the first additional function data to the first communication counterpart device by the additional function data handling circuitry, the I/O cell is reconfigurable as an input cell, and the additional function data handling circuitry is configurable to receive second additional function data via the I/O cell from the first communication counterpart device.

13. The communication device of claim 1,
wherein, after the additional function communication start signal has been detected and while the I/O cell is being used for transmitting additional function data, the regular bidirectional interface can, without interruption, be used in a respective standard mode function for sending and receiving bus data according to the respective bus standard, for example which is at least one of the CAN bus standard, the LIN bus standard, and the FlexRay standard.

14. The communication device of claim 1,
  wherein the additional function communication start signal is a pulse having at least a predefined polarity or a predefined pulse width;
  wherein, after having sent first additional function data via the I/O cell and the first additional pin and when second additional function data are not to be sent in response to having sent the first additional function data, the first additional pin is reconfigurable to be used in its default mode function for transmitting default data; and
  wherein, after having sent first additional function data via the I/O cell and the first additional pin in a first direction and after having sent second additional function data via the I/O cell and the first additional pin in a second direction opposite to the first direction, the first additional pin is reconfigurable to be used in its default mode function for transmitting default data.

15. The communication device of claim 1, wherein the communication device is a CAN, LIN, or FlexRay transceiver, and the second communication counterpart device is a corresponding microcontroller comprising a CAN, LIN, or FlexRay controller.

16. The communication device of claim 15,
  wherein the communication device is a transceiver configured for sending and receiving data over a data bus, and for sending bus data to and receiving bus data from a corresponding microcontroller;
  wherein the predetermined regular pinout of the transceiver has a bus pin, a first input pin and a first output pin, and
  wherein the transceiver has:
    a bus interface communicatively coupled to the bus pin, and configured to send bus data via the bus pin to, and to receive bus data via the bus pin from, the data bus;
    a first input cell communicatively coupled to the first input pin, and configured to receive bus transmit data from the microcontroller; and
    a first output driver communicatively coupled to the first output pin, and configured to transmit bus receive data to the microcontroller.

17. The communication device of claim 15, wherein:
  a) the data bus is a CAN bus, the first input pin is a TXDC pin, the first output pin is a RXDC pin, and the first additional pin is an S input pin, and the bus port comprises a CANH pin and a CANL pin;
  b) the data bus is a LIN bus, the first input pin is a TXDL pin, the first output pin (802) is a RXDL pin, and the first additional pin is an SLP_N input pin, and the bus port comprises LIN pin; or
  c) the data bus is a FlexRay bus, the first input pin is a TXD pin, the first output pin is a RXD pin, and the first additional pin is an EN input pin, and the bus port comprises a BP pin and a BM pin.

18. A method for transmitting and receiving data between a communication device and a second communication counterpart device, the method comprising:
  in the default mode, communicatively coupling the first additional default data handling circuitry to the I/O cell, and transmitting additional default data from the first additional default data handling circuitry via the I/O cell and the first additional pin to the second communication counterpart device or receiving additional default data by the first additional default data handling circuitry via the first additional pin and the I/O cell from the second communication counterpart device;
  monitoring, by the additional pin monitoring device, data traffic of additional default data passing via the first additional pin;
  detecting, by said additional pin monitoring device, an additional function communication start signal in the data traffic; and
  in response to detecting the additional function communication start signal in the data traffic, deactivating the default mode and activating the additional function mode, communicatively coupling the additional function data handling circuitry to the I/O cell, and transmitting additional function data from the additional function data handling circuitry via the I/O cell and the first additional pin to the second communication counterpart device or receiving additional function data by the additional function data handling circuitry via the first additional pin and the I/O cell from the second communication counterpart device.

19. The method of claim 18, further comprising:
  in the default mode, configuring the I/O cell as an output driver for transmitting default data from first additional default data handling circuitry via the I/O cell and the first additional pin to the second communication counterpart device;
  by the communication device, initiating an additional communication for the additional function data handling circuitry and transmitting an additional function communication start signal via the first additional pin to the second communication counterpart device;
  by said additional pin monitoring device, detecting the additional function communication start signal, deactivating the default mode, and activating the additional function mode;
  communicatively coupling the additional function data handling circuitry to the I/O cell;
  by the additional function data handling circuitry, transmitting first additional function data via the I/O cell to the second communication counterpart device;
  after transmitting the first additional function data from the additional function data handling circuitry to the second communication counterpart device, reconfiguring the I/O cell as an input cell;
  by the additional function data handling circuitry, receiving second additional function data via the I/O cell from the second communication counterpart device, and reconfiguring the I/O cell as an output driver; and
deactivating the additional function mode and activating the default mode.

20. The method of claim 18, further comprising:
  in the default mode, configuring the I/O cell as an input cell for transmitting default data from the second communication counterpart device via the first additional pin and the I/O cell to the first additional default data handling circuitry,
  by the communication device, initiating an additional communication for the additional function data handling circuitry, and transmitting an additional function communication start signal via the first additional pin to the second communication counterpart device;
  by said additional pin monitoring device, detecting the additional function communication start signal, deactivating the default mode and activating the additional function mode;
  reconfiguring the I/O cell as an output driver;
  communicatively coupling the additional function data handling circuitry to the I/O cell;

by the additional function data handling circuitry, transmitting first additional function data via the I/O cell to the second communication counterpart device;
after transmitting the first additional function data from the additional function data handling circuitry to the second communication counterpart device, reconfiguring the I/O cell as an input cell, by the additional function data handling circuitry, receiving second additional function data via the I/O cell from the second communication counterpart device; and
deactivating the additional function mode and activating the default mode.

21. The method of claim 18, further comprising:
in the default mode, configuring the I/O cell as an input cell for transmitting default data from the second communication counterpart device via the first additional pin and the I/O cell to the first additional default data handling circuitry;
by the second communication counterpart device, initiating an additional function communication for the additional function data handling circuitry and transmitting an additional function communication start signal via the first additional pin to the communication device;
by the additional pin monitoring device, detecting the additional function communication start signal, deactivating the default mode and activating the additional function mode;
reconfiguring the I/O cell as an output driver and the I/O cell as an input driver, communicatively coupling the additional function data handling circuitry to the I/O cell;
by the additional function data handling circuitry, transmitting first additional function data via the I/O cell to the second communication counterpart device;
after transmitting the first additional function data from the additional function data handling circuitry to the second communication counterpart device, reconfiguring the I/O cell as an input cell;
by the additional function data handling circuitry, receiving second additional function data via the I/O cell from the second communication counterpart device; and
deactivating the additional function mode and activating the default mode.

22. The method of claim 18, further comprising:
in the default mode, configuring the I/O cell as an output driver for transmitting default data from the first additional default data handling circuitry via the I/O cell and the first additional pin to the second communication counterpart device;
by the second communication counterpart device, initiating an additional communication for the additional function data handling circuitry;
reconfiguring the I/O cell as an output cell;
transmitting an additional function communication start signal via the first additional pin to the communication device;
by said additional pin monitoring device, detecting the additional function communication start signal, deactivating the default mode and activating the additional function mode;
reconfiguring the I/O cell as an input cell;
communicatively coupling the additional function data handling circuitry to the I/O cell;
by the second communication counterpart device, transmitting first additional function data via the I/O cell to the additional function data handling circuitry;
after transmitting the first additional function data from the second communication counterpart device to the additional function data handling circuitry, reconfiguring the I/O cell as an input cell and the I/O cell as an output driver; and
by the additional function data handling circuitry, transmitting second additional function data via the I/O cell to the second communication counterpart device, and deactivating the additional function mode and activating the default mode.

23. The method of claim 18, further comprising:
configuring the I/O cell to operate as an additional input cell when the I/O cell is used to transmit additional function data from the second communication counterpart device to the additional function data handling circuitry; and
configuring the I/O cell to operate as an additional output driver when the I/O cell is used to transmit additional function data from the additional function data handling circuitry to the second communication counterpart device.

24. The method of claim 18, further comprising
in response to detecting the additional function communication start signal, stopping using the first additional pin in its default mode function of transmitting additional default data.

25. The method of claim 18, further comprising:
after having detected the additional function communication start signal and while using the I/O cell for transmitting additional function data, using the pins of the predetermined regular pinout without interruption in their standard mode function for transmitting and receiving regular data.

26. The method of claim 18, further comprising:
after having sent first additional function data via the I/O cell and the first additional pin in a first direction and further after having sent second additional function data in a second direction opposite to the first direction via the I/O cell and the first additional pin, reconfiguring the first additional pin to be used in its function according to the default mode of transmitting default data.

* * * * *